US012793615B2

(12) United States Patent
Park et al.

(10) Patent No.: US 12,793,615 B2
(45) Date of Patent: Nov. 10, 2026

(54) STAGE CIRCUIT AND DISPLAY DEVICE INCLUDING THE SAME, AND ELECTRONIC DEVICE

(71) Applicant: Samsung Display Co., LTD., Yongin-si (KR)

(72) Inventors: Jun Hyun Park, Yongin-si (KR); Young Wan Seo, Yongin-si (KR); Min Jae Jeong, Yongin-si (KR); Bon Yong Koo, Yongin-si (KR); Tae Gyun Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/068,315

(22) Filed: Mar. 3, 2025

(65) Prior Publication Data

US 2025/0299625 A1 Sep. 25, 2025

(30) Foreign Application Priority Data

Mar. 25, 2024 (KR) ........................ 10-2024-0040387

(51) Int. Cl.
*G09G 3/32* (2016.01)

(52) U.S. Cl.
CPC ......... *G09G 3/32* (2013.01); *G09G 2300/043* (2013.01); *G09G 2310/0267* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 10,748,471 | B2 | 8/2020 | Hwang | |
| 11,915,656 | B2 | 2/2024 | Kim | |
| 11,929,033 | B2 | 3/2024 | Kim et al. | |
| 2011/0150169 | A1* | 6/2011 | Lin | G11C 19/28 377/64 |
| 2012/0001955 | A1* | 1/2012 | Yamazaki | G09G 3/3688 345/87 |

(Continued)

FOREIGN PATENT DOCUMENTS

| | | | |
|---|---|---|---|
| KR | 101575501 | B1 | 12/2015 |
| KR | 102471321 | B1 | 11/2022 |

(Continued)

OTHER PUBLICATIONS

Extended European Search Report mailed Jul. 1, 2025 in EP 25166008.0, 14 pages.

*Primary Examiner* — Sarvesh J Nadkarni
(74) *Attorney, Agent, or Firm* — CANTOR COLBURN LLP

(57) ABSTRACT

A stage circuit includes an output unit which supplies a scan signal to an output terminal in response to a voltage of a first node and a second node, an input unit which outputs a carry signal or a start signal input to a first input terminal in response to a clock signal, a first transistor connected between the input unit and the second node and set to a turn-on state during a driving period, and a controller connected between the input unit and the first transistor or between the first transistor and the second node, where the controller controls an electrical connection between the input unit and the second node.

20 Claims, 26 Drawing Sheets

(56) References Cited

U.S. PATENT DOCUMENTS

| | | | | |
|---|---|---|---|---|
| 2019/0164498 | A1* | 5/2019 | Jang | G09G 3/3266 |
| 2019/0172397 | A1* | 6/2019 | Lee | G09G 3/3266 |
| 2020/0294461 | A1* | 9/2020 | Xu | G09G 3/3677 |
| 2021/0074215 | A1 | 3/2021 | Park et al. | |
| 2023/0282158 | A1* | 9/2023 | Lin | G09G 3/32<br>345/212 |
| 2023/0326413 | A1 | 10/2023 | In et al. | |
| 2024/0030905 | A1 | 1/2024 | Kimura et al. | |
| 2024/0221624 | A1* | 7/2024 | Shin | G09G 3/20 |
| 2024/0242649 | A1* | 7/2024 | Fan | G09G 3/3266 |

FOREIGN PATENT DOCUMENTS

| | | | |
|---|---|---|---|
| KR | 1020230099110 | A | 7/2023 |
| KR | 1020230101466 | A | 7/2023 |
| KR | 1020230101507 | A | 7/2023 |

* cited by examiner

STAGE CIRCUIT AND DISPLAY DEVICE INCLUDING THE SAME, AND ELECTRONIC DEVICE

This application claims priority to Korean Patent Application No. 10-2024-0040387, filed on Mar. 25, 2024, and all the benefits accruing therefrom under 35 U.S.C. § 119, the content of which in its entirety is herein incorporated by reference.

BACKGROUND

1. Field

The disclosure relates to a stage circuit and a display device including the stage circuit, and electronic device.

2. Description of the Related Art

As information technology develops, importance of a display device, which is a connection medium between a user and information, is emerging. Accordingly, a display device such as a liquid crystal display device and an organic light emitting display device is widely used in various fields.

SUMMARY

A display device may display an image by selecting a pixel while supplying a scan signal using a scan driver and supplying a data signal to the selected pixel. Here, a technology that may secure reliability of the scan driver when the display device is driven at a low driving frequency may be desired. In addition, a technology that may reduce power consumption of the display device may be desired.

Embodiments of the disclosure provide a stage circuit that may secure reliability of driving by minimizing a leakage current of the stage circuit at a low driving frequency, and a display device including the stage circuit.

Embodiments of the disclosure provide a stage circuit that may minimize power consumed in the stage circuit, and a display device including the stage circuit.

According to embodiments of the disclosure, a stage circuit includes an output unit which supplies a scan signal to an output terminal in response to a voltage of a first node and a second node, an input unit which outputs a carry signal or a start signal input to a first input terminal in response to a clock signal, a first transistor connected between the input unit and the second node and set to a turn-on state during a driving period, and a controller connected between the input unit and the first transistor or between the first transistor and the second node, where the controller controls an electrical connection between the input unit and the second node.

According to an embodiment, the controller may be connected between the input unit and the first transistor.

According to an embodiment, the controller may be connected between the first transistor and the second node.

According to an embodiment, the controller may include a second transistor.

According to an embodiment, a gate electrode of the second transistor may be connected to the first node.

According to an embodiment, a gate electrode of the second transistor may be connected to a control input terminal, and the control input terminal may receive a control signal.

According to an embodiment, one frame period may include a display scan period in which a data signal is received and a self-scan period in which light is emitted while maintaining the data signal, and the control signal may be set to a voltage level at which the second transistor is turned on during the display scan period, and be set to a voltage level at which the second transistor is turned off during the self-scan period.

According to an embodiment, the second transistor may further include a second gate electrode, and the second gate electrode may be electrically connected to a gate electrode of the second transistor.

According to an embodiment, the second transistor may further include a second gate electrode, and the second gate electrode may receive a direct current (DC) voltage.

According to an embodiment, the second transistor may further include a second gate electrode, and the second gate electrode may receives an alternating current (AC) voltage.

According to an embodiment, the first transistor and the second transistor may be transistors of different types.

According to an embodiment, the first transistor may be a P-type transistor and the second transistor may be an N-type transistor.

According to an embodiment, the first transistor may be an N-type transistor and the second transistor may be a P-type transistor.

According to an embodiment, the first transistor and the second transistor may be P-type transistors.

According to an embodiment, the first transistor and the second transistor may be N-type transistors.

According to an embodiment, the stage circuit may further include a driver for controlling the voltage of the first node, and the controller may be connected between the driver and the first transistor.

According to an embodiment, the stage circuit may further include a driver for controlling the voltage of the first node, and the controller may be connected between the input unit and the driver.

According to an embodiment of the disclosure, a display device includes pixels connected to scan lines, emission control lines, and data lines, a scan driver which supplies a scan signal to the scan lines, and an emission driver which supplies an emission control signal to the emission control lines, where a stage circuit is included in at least one selected from the scan driver and the emission driver, and the stage circuit includes an output unit which supplies the scan signal or the emission control signal to an output terminal in response to a voltage of a first node and a second node, an input unit which outputs a carry signal or a start signal input to a first input terminal in response to a clock signal, a first transistor connected between the input unit and the second node and set to a turn-on state during a driving period, and a controller connected between the input unit and the first transistor or between the first transistor and the second node, where the controller controls an electrical connection between the input unit and the second node.

According to an embodiment, the controller may include a second transistor.

According to an embodiment, a gate electrode of the second transistor may be connected to the first node.

According to an embodiment of the disclosure, an electronic device includes a processor to provide input image data; and a display device to display an image based on the input image data; Wherein the display device includes pixels connected to scan lines, emission control lines, and data lines, a scan driver which supplies a scan signal to the scan lines, and an emission driver which supplies an emission control signal to the emission control lines, where a stage circuit is included in at least one selected from the scan driver and the emission driver, and the stage circuit includes an output unit which supplies the scan signal or the emission control signal to an output terminal in response to a voltage of a first node and a second node, an input unit which outputs a carry signal or a start signal input to a first input terminal in response to a clock signal, a first transistor connected between the input unit and the second node and set to a turn-on state during a driving period, and a controller connected between the input unit and the first transistor or between the first transistor and the second node, where the controller controls an electrical connection between the input unit and the second node.

In accordance with a stage circuit according to embodiments of the disclosure and a display device including the stage circuit, a leakage current may be minimized by a controller (or a second transistor) that maintains a turn-on state during a first period (for example, a display scan period or a period in which an enable scan signal is output) and maintains a turn-off state during a second period (for example, a self-scan period or a period in which a disable scan signal is output).

In embodiments of the disclosure, a voltage of a second node included in an output unit of the stage circuit may be boosted, thereby minimizing power consumption.

However, an effect of the disclosure is not limited to the above-described effect, and may be variously extended within a range that does not deviate from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
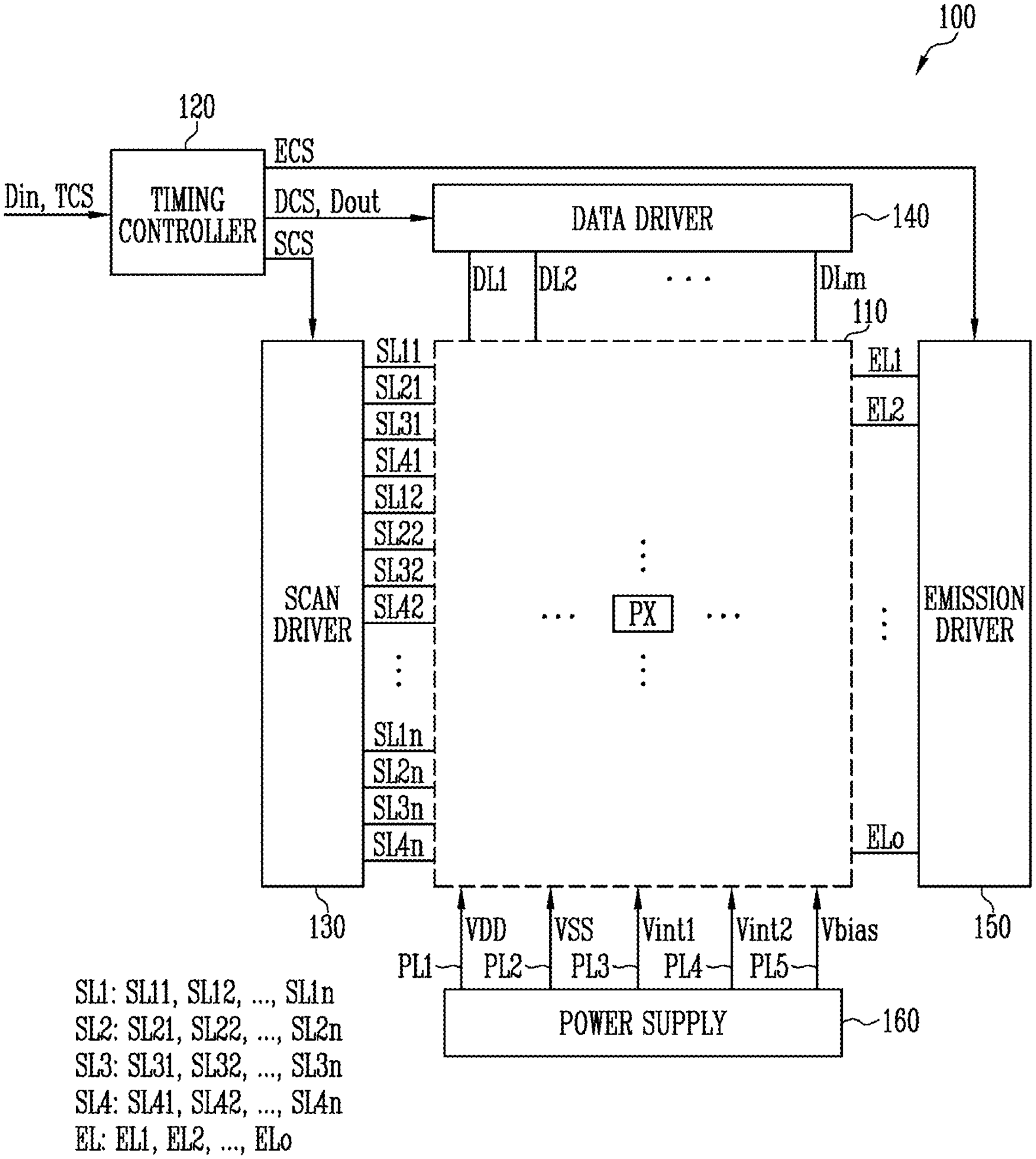
FIG. 1 is a diagram illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In order to clearly describe the disclosure, parts that are not related to the description are omitted, and the same or similar elements are denoted by the same reference numerals throughout the specification. Therefore, the above-described reference numerals may be used in other drawings.

In addition, since a size and a thickness of each configuration shown in the drawings are arbitrarily shown for convenience of description, the disclosure is not necessarily limited to that shown in the drawings. In order to clearly express multiple layers and areas in the drawing, a thickness may be exaggerated.

In addition, an expression “is the same” in the description may mean “is substantially the same”. That is, the expression “is the same” may be the same enough for those of ordinary skill to understand that it is the same. Other expressions may also be expressions in which “substantially” is omitted.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the inventive concept. In addition, in some embodiments, the block, unit and/or module may be physically combined into more complex blocks, units, and/or modules without departing from the scope of the inventive concept.

A term "connection" between two configurations may mean that both of an electrical connection and a physical connection are used inclusively, but is not limited thereto. For example, "connection" used based on a circuit diagram may mean an electrical connection, and "connection" used based on a cross-sectional view and a plan view may mean a physical connection.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the disclosure will be described in detail with reference to the accompanying drawings.

Figure 2:
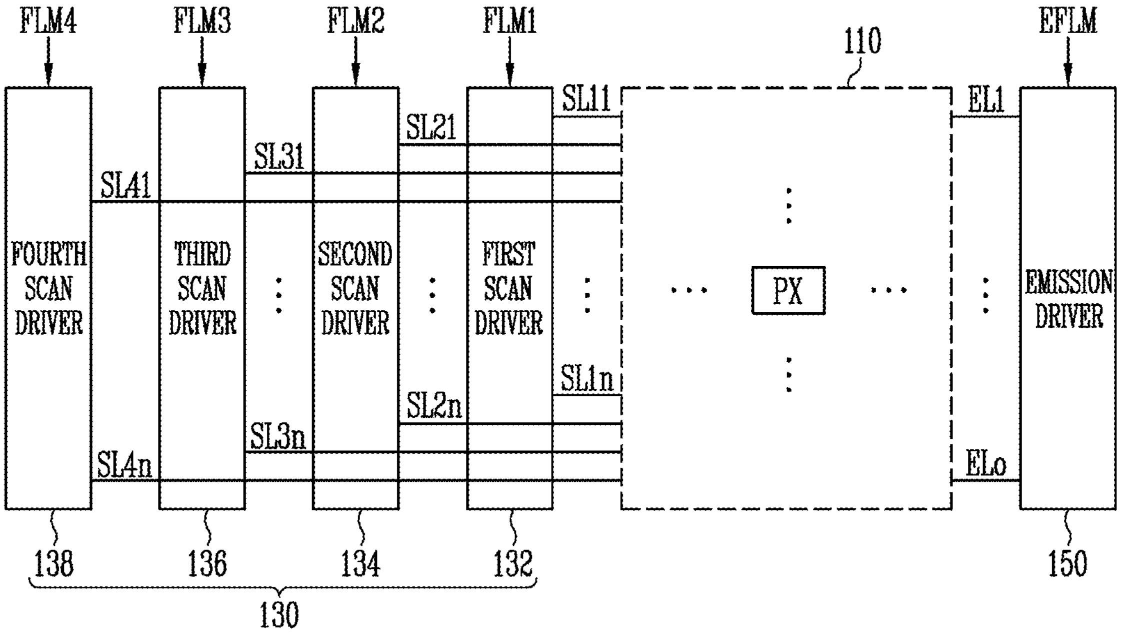
FIG. 2 is a diagram illustrating an embodiment of a scan driver and an emission driver shown in FIG. 1.

FIG. 1 is a diagram illustrating a display device according to an embodiment of the disclosure. FIG. 2 is a diagram illustrating an embodiment of a scan driver and an emission driver shown in FIG. 1.

Referring to FIG. 1, the display device 100 according to an embodiment of the disclosure may include a pixel unit 110 (or a display panel), a timing controller 120, the scan driver 130, a data driver 140, the emission driver 150, and a power supply 160.

The display device 100 may display an image at various image refresh rates (driving frequencies, or screen reproduction rate) determined based on a driving condition. The image refresh rate refers to a frequency at which a data signal is written to a driving transistor of a pixel PX. For example, the image refresh rate may be referred to as a screen scan rate or a screen reproduction rate, and may indicate a frequency at which a display screen is reproduced per second.

In an embodiment, an output frequency of the data driver for one horizontal line (for example, pixels PX connected to a same scan line may be classified into one horizontal line (or pixel row)) and/or an output frequency of a first scan driver 132 that outputs a first scan signal (or write scan signal) may be determined in correspondence with the image refresh rate. For example, the image refresh rate for moving image driving may be a frequency of about 60 hertz (Hz) or higher (for example, 120 Hz, 240 Hz, or the like).

For example, the display device 100 may display an image in correspondence with various image refresh rates of 1 Hz to 240 Hz. However, this is an example, and the display device 100 may display an image at an image refresh rate of 240 Hz or higher (for example, 480 Hz).

The pixel unit 110 may include pixels PX connected to first scan lines SL11, SL12, . . . , and SLIn, second scan lines SL21, SL22, . . . , and SL2*n*, third scan lines SL31, SL32, . . . , and SL3*n*, fourth scan lines SL41, SL42, . . . , and SL4*n*, data lines DL1, DL2, . . . , and DLm, emission control lines EL1, EL2, . . . , and ELo and power lines PL1, PL2, PL3, PL4, and PL5 (here, n, m, o are natural numbers equal to or greater than 2).

For example, a pixel PXij (refer to FIG. 3) positioned on an i-th horizontal line (or pixel row) and a j-th vertical line (or pixel column) may be connected to an i-th first scan line SL1*i*, an i-th second scan line SL2*i*, an i-th third scan line SL3*i*, an i-th fourth scan line SL4*i*, a k-th emission control line ELk, and a j-th data line DLj (here, i is a natural number equal to or less than n, j is a natural number equal to or less than m, and k is a natural number equal to or less than o). Here, k may be a number equal to i or less than i. In an embodiment, for example, where each of the emission control lines EL1 to ELo is connected to a pixel PX positioned on one horizontal line, k may be the same number as i. In an embodiment, for example, where each of the emission control lines EL1 to ELo is connected to pixels PX positioned on two or more horizontal lines, k may be a number less than i.

The pixels PX may be selected (or activated) in a horizontal line unit (or on a horizontal line-by-horizontal line basis) when an enable first scan signal is supplied to the first scan lines SL11 to SLIn, and the pixels PX selected by the enable first scan signal may receive a data signal from a data line (one of DL1 to DLm) connected thereto. The pixels PX receiving the data signal may generate light of a predetermined luminance in response to a voltage of the data signal.

The scan driver 130 may receive a scan driving signal SCS from the timing controller 120. The scan driving signal SCS may include at least one scan start signal and clock signals used for driving the scan driver 130. The scan driver 130 may generate an enable first scan signal, an enable second scan signal, an enable third scan signal, and an enable fourth scan signal while shifting the scan start signal in response to the clock signal.

In an embodiment, as shown in FIG. 2, the scan driver 130 may include a first scan driver 132, a second scan driver 134, a third scan driver 136, and a fourth scan driver 138. In such an embodiment, at least two selected from the scan drivers 132, 134, 136, and 138 may be integrated into one driver circuit, module, or the like, if desired.

The first scan driver 132 may receive a first scan start signal FLM1 and generate the enable first scan signal by shifting the first scan start signal FLM1 in response to the clock signal. The first scan driver 132 may sequentially supply the enable first scan signal to first scan lines SL11 to SLn. In an embodiment, the first scan driver 132 may supply the enable first scan signal during a display scan period of one frame.

The second scan driver 134 may receive a second scan start signal FLM2 and generate the enable second scan signal by shifting the second scan start signal FLM2 in response to the clock signal. The second scan driver 134 may sequentially supply the enable second scan signal to the second scan lines SL21 to SL2*n*. In an embodiment, the second scan driver 134 may supply the enable second scan signal during the display scan period of one frame.

The third scan driver 136 may receive a third scan start signal FLM3 and generate the enable third scan signal by shifting the third scan start signal FLM3 in response to the clock signal. The third scan driver 136 may sequentially supply the enable third scan signal to third scan lines SL31 to SL3*n*. In an embodiment, the third scan driver 136 may supply the enable third scan signal during the display scan period of one frame.

The fourth scan driver 138 may receive a fourth scan start signal FLM4 and generate the enable fourth scan signal by shifting the fourth scan start signal FLM4 in response to the clock signal. The fourth scan driver 138 may sequentially supply the enable fourth scan signal to fourth scan lines SL41 to SL4*n*.

In an embodiment, the fourth scan driver 138 may supply the enable fourth scan signal during the display scan period and a self-scan period of one frame. In an embodiment, for example, the fourth scan driver 138 may perform scanning once during the display scan period (that is, supply at least one enabled fourth scan signal), and perform scanning at least once according to the image refresh rate during the self-scan period. When the image refresh rate is reduced (that is, a frame length is increased), the number of repetitions of an operation of supplying the fourth enable scan signal to each of the fourth scan lines SL41 to SL4*n* by the fourth scan driver 138 in the frame period may be increased.

The enable first scan signal, the enable second scan signal, the enable third scan signal, and the enable fourth scan signal may be set to a gate-on voltage such that a transistor included in the pixels PX may be turned on.

Figure 3:
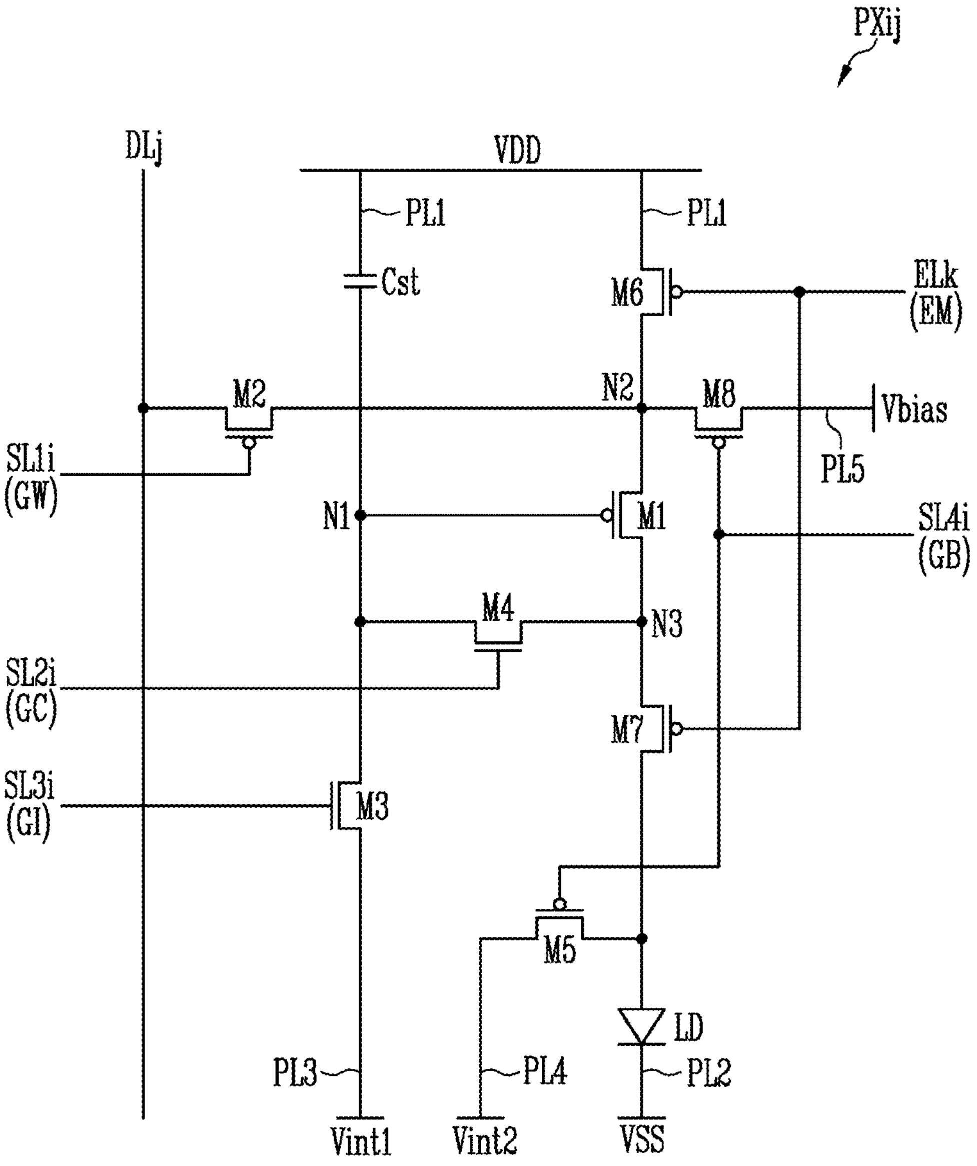
FIG. 3 is a diagram illustrating a pixel according to an embodiment of the disclosure.

In an embodiment, for example, as shown in FIG. 3, the enable first scan signal GW and the enable fourth scan signal GB supplied to a P-type transistor may be set to a low level voltage, and the enable second scan signal GC and the enable third scan signal GI supplied to an N-type transistor may be set to a high level voltage.

In FIG. 2, the first scan driver 132, the second scan driver 134, the third scan driver 136 and the fourth scan driver 138 are shown to be connected to the respective first scan line SL1, second scan line SL2, third scan line SL3, and fourth scan line SL4, but an embodiment of the disclosure is not limited thereto. In an embodiment, for example, at least two (at least two of SL1, SL2, SL3, and SL4) selected from the first scan line SL1, the second scan line SL2, the third scan line SL3, and the fourth scan line SL4 may be driven by one scan driver.

In an embodiment, for example, the second scan line SL2 and the third scan line SL3 may be driven by one scan driver. In such an embodiment, one of the second scan driver 134 and the third scan driver 136 shown in FIG. 2 may be omitted.

Referring back to FIG. 1, the data driver 140 may receive output data Dout and a data driving signal DCS from the timing controller 120. The data driving signal DCS may include sampling signals and/or timing signals used for driving the data driver 140. The data driver 140 may generate a data signal based on the data driving signal DCS and the output data Dout. For example, the data driver 140 may generate an analog data signal based on a grayscale of the output data Dout. The data driver 140 may supply the data signal in one horizontal period unit (or every one horizontal period).

The emission driver 150 may receive an emission driving signal ECS from the timing controller 120. The emission driving signal ECS may include an emission start signal and clock signals used for driving the emission driver 150. The emission driver 150 may generate a disable emission control signal EM while shifting the emission start signal in response to the clock signal.

In an embodiment, as shown in FIG. 2, the emission driver 150 may receive the emission start signal EFLM and generate the disable emission control signal EM while shifting the emission start signal EFLM in response to the clock signal. The emission driver 150 may sequentially supply the disable emission control signal EM to the emission control lines EL1 to ELo. The disable emission control signal EM may be set to a gate-off voltage so that the transistor included in the pixels PX may be turned off. In an embodiment, for example, as shown in FIG. 3, the disable emission control signal EM supplied to a P-type transistor may be set to a high level voltage.

In an embodiment, the emission driver 150 may supply the disable emission control signal during the display scan period and the self-scan period of one frame. In an embodiment, for example, the emission driver 150 may perform scanning once during the display scan period of one frame, and may perform scanning at least once according to the image refresh rate during the self-scan period. When the image refresh rate is reduced (that is, the frame length is increased), the number of repetitions of an operation of supplying the disable emission control signal EM to each of the emission control lines EL1 to ELo by the emission driver 150 in the frame period may be increased.

The timing controller 120 may receive input data Din and a timing control signal TCS from a host system through an interface. In an embodiment, for example, the timing controller 120 may receive the input data Din and the timing control signal TCS from at least one of a graphics processing unit (GPU), a central processing unit (CPU), and an application processor (AP) included in the host system. The timing control signal TCS may include various signals including a clock signal.

The timing controller 120 may generate the scan driving signal SCS, the data driving signal DCS, and the emission driving signal ECS based on the timing control signal TCS. The scan driving signal SCS, the data driving signal DCS, and the emission driving signal ECS may be supplied to the scan driver 130, the data driver 140, and the emission driver 150, respectively.

The timing controller 120 may rearrange the input data Din to fit a specification of the display device 100. In addition, the timing controller 120 may correct the input data Din to generate the output data Dout and supply the output data Dout to the data driver 140. In an embodiment, the timing controller 120 may correct the input data Din in response to an optical measurement result measured in a process.

The power supply 160 may generate various power used for driving the display device 100. In an embodiment, for example, the power supply 160 may generate a first driving power (or voltage) VDD, a second driving power VSS, a first initialization power Vint1, a second initialization power Vint2, and a bias power Vbias.

The first driving power VDD may be power that supplies a driving current to the pixels PX. The second driving power VSS may be power that receives the driving current from the pixels PX. During a period in which the pixels PX are set to an emission state, the first driving power VDD may be set to a voltage higher than that of the second driving power VSS.

The first initialization power Vint1 may be a power that initializes a gate electrode of the driving transistor included in each of the pixels PX. The first initialization power Vint1 may be set to a voltage lower than that of the data signal. The second initialization power Vint2 may be power that initializes a first electrode (or an anode electrode) of a light emitting element LD included in each of the pixels PX. The second initialization power Vint2 may be set to a voltage at which the light emitting element LD is turned off. The bias power Vbias may be power for applying an on bias voltage to the driving transistor included in each of the pixels PX.

The first driving power VDD generated by the power supply 160 may be supplied to a first power line PL1, the second driving power VSS may be supplied to a second power line PL2, the first initialization power Vint1 may be supplied to a third power line PL3, the second initialization power Vint2 may be supplied to a fourth power line PL4, and the bias power Vbias may be supplied to a fifth power line PL5. In an embodiment, for example, the first power line PL1, the second power line PL2, the third power line PL3, the fourth power line PL4, and the fifth power line PL5 are commonly connected to the pixels PX, but an embodiment of the disclosure is not limited thereto.

In an embodiment, the first power line PL1 may include or be configured of a plurality of power lines, and the plurality of power lines may be connected to different pixels PX. In an embodiment, the second power line PL2 may include or be configured of a plurality of power lines, and the plurality of power lines may be connected to different pixels PX. In an embodiment, the third power line PL3 may include or be configured of a plurality of power lines, and the plurality of power lines may be connected to different pixels PX. In an embodiment, the fourth power line PL4 may include or be configured of a plurality of power lines, and the plurality of power lines may be connected to different pixels PX. In an embodiment, the fifth power line PL5 may include or be configured of a plurality of power lines, and the plurality of power lines may be connected to different pixels PX. That is, in such an embodiment of the disclosure, each of the pixels PX may be connected to a corresponding one of the first power line PL1, a corresponding one of the second power line PL2, a corresponding one of the third power line PL3, a corresponding one of the fourth power line PL4, and a corresponding one of the fifth power line PL5. In an embodiment of the disclosure, the display device 100 may be a flat display device, a curved display device in which a portion of the pixel unit 110 is bent, a flexible display device in which a portion may be folded or bent, and a stretchable display device in which a portion may be expanded and contracted.

In an embodiment of the disclosure, the display device 100 may be a device that displays a moving image or a still image, and may include a portable electronic device such as a mobile phone, a smart phone, a tablet personal computer (PC), a smart watch, a watch phone, a mobile communication terminal, an electronic notebook, an e-book, a portable multimedia player (PMP), a navigation, and an ultra mobile PC (UMPC). In an embodiment of the disclosure, the display device 100 may include an electronic device such as a television, a notebook computer, a monitor, a billboard, or Internet of things (IoT).

FIG. 3 is a diagram illustrating a pixel according to an embodiment of the disclosure. FIG. 3 shows a pixel positioned on an i-th horizontal line and a j-th vertical line.

Referring to FIG. 3, the pixel PXij according to an embodiment of the disclosure may be connected to corresponding signal lines SL1*i*, SL2*i*, SL3*i*, SL4*i*, ELk, and DLj. For example, the pixel PXij may be connected to the i-th first scan line SL1*i*, the i-th second scan line SL2*i*, the i-th third scan line SL3*i*, the i-th fourth scan line SL4*i*, the k-th emission control line Elk, and the j-th data line DLj. In an embodiment, the pixel PXij may be further connected to the first power line PL1, the second power line PL2, the third power line PL3, the fourth power line PL4, and the fifth power line PL5.

The pixel PXij according to an embodiment of the disclosure may include the light emitting element LD and a pixel circuit for controlling a current amount supplied to the light emitting element LD.

The light emitting element LD may be connected between the first power line PL1 and the second power line PL2. In an embodiment, for example, the first electrode (or the anode electrode) of the light emitting element LD may be electrically connected to the first power line PL1 via a seventh transistor M7, a third node N3, a first transistor M1, a second node N2, and a sixth transistor M6, and a second electrode (or a cathode electrode) of the light emitting element LD may be electrically connected to the second power line PL2. The light emitting element LD may generate light of a predetermined luminance in response to the current amount supplied from the first power line PL1 to the second power line PL2 via the pixel circuit.

In an embodiment, the light emitting element LD may include an organic light emitting diode. In another embodiment, the light emitting element LD may include an inorganic light emitting diode such as a micro light emitting diode (LED) or a quantum dot light emitting diode. In another embodiment, the light emitting element LD may be an element configured of a composite of an organic material and an inorganic material. In an embodiment, as shown in FIG. 3, the pixel PXij may include a single light emitting element LD. However, in another embodiment, the pixel PXij may include a plurality of light emitting elements LD, and the plurality of light emitting elements LD may be connected to each other in series, parallel, or series-parallel.

In an embodiment, as shown in FIG. 3, the pixel circuit may include the first transistor M1, a second transistor M2, a third transistor M3, a fourth transistor M4, a fifth transistor M5, the sixth transistor M6, the seventh transistor M7, an eighth transistor M8, and a storage capacitor Cst.

A first electrode of the first transistor M1 (or a driving transistor) may be connected to the second node N2, and a second electrode thereof may be connected to the third node N3. In addition, a gate electrode of the first transistor M1 may be connected to a first node N1. The first transistor M1 may control the current amount supplied from the first driving power VDD to the second driving power VSS via the light emitting element LD in response to a voltage of the first node N1.

The second transistor M2 may be connected between the data line DLj and the second node N2. In addition, a gate electrode of the second transistor M2 may be electrically connected to the first scan line SL1*i*. The second transistor M2 may be turned on when the enable first scan signal GW is supplied to the first scan line SL1*i* to electrically connect the data line DLj and the second node N2.

A first electrode of the third transistor M3 may be connected to the first node N1, and a second electrode thereof may be electrically connected to the third power line PL3. In addition, a gate electrode of the third transistor M3 may be electrically connected to the third scan line SL3*i*. The third transistor M3 may be turned on when the enable third scan signal GI is supplied to the third scan line SL3*i* to supply a voltage of the first initialization power Vint1 to the first node N1.

The fourth transistor M4 may be connected between the first node N1 and the third node N3. In addition, a gate electrode of the fourth transistor M4 may be electrically connected to the second scan line SL2*i*. The fourth transistor M4 may be turned on when the enable second scan signal GC is supplied to the second scan line SL2*i* to electrically connect the first node N1 and the third node N3. That is, when the fourth transistor M4 is turned on, the first transistor M1 may be connected in a diode form.

A first electrode of the fifth transistor M5 may be connected to the first electrode of the light emitting element LD, and a second electrode thereof may be electrically connected to the fourth power line PL4. In addition, a gate electrode of the fifth transistor M5 may be electrically connected to the fourth scan line SL4*i*. The fifth transistor M5 may be turned on when the enable fourth scan signal GB is supplied to the fourth scan line SL4*i* to supply a voltage of the second initialization power Vint2 to the first electrode of the light emitting element LD.

When the voltage of the second initialization power Vint2 is supplied to the first electrode of the light emitting element LD, a parasitic capacitor of the light emitting element LD may be discharged. As a residual voltage charged in the parasitic capacitor of the light emitting element LD is discharged (or removed), unintentional micro-emission may be effectively prevented. Therefore, a black expression ability of the pixel PXij may be improved.

A first electrode of the sixth transistor M6 may be electrically connected to the first power line PL1, and a second electrode thereof may be connected to the second node N2. In addition, a gate electrode of the sixth transistor M6 may be electrically connected to the emission control line ELk. The sixth transistor M6 may be turned off when the disable emission control signal EM is supplied to the emission control line Elk, and may be turned on when the enable emission control signal EM is supplied.

The seventh transistor M7 may be connected between the third node N3 and the first electrode of the light emitting element LD. In addition, a gate electrode of the seventh transistor M7 may be electrically connected to the emission control line ELk. The seventh transistor M7 may be turned off when the disable emission control signal EM is supplied to the emission control line Elk, and may be turned on when the enable emission control signal EM is supplied.

A first electrode of the eighth transistor M8 may be electrically connected to the fifth power line PL5, and a second electrode thereof may be connected to the second node N2. In addition, a gate electrode of the eighth transistor M8 may be electrically connected to the fourth scan line SL4*i*. The eighth transistor M8 may be turned on when the enable fourth scan signal GB is supplied to the fourth scan line SL4*i* to electrically connect the fifth power line PL5 and the second node N2.

The storage capacitor Cst may be connected between the first power line PL1 and the first node N1. The storage capacitor Cst may store a voltage applied to the first node N1.

In an embodiment, the first transistor M1, the second transistor M2, the fifth transistor M5, the sixth transistor M6, the seventh transistor M7, and the eighth transistor M8 may be formed of a polysilicon semiconductor transistor. In an embodiment, for example, the first transistor M1, the second transistor M2, the fifth transistor M5, the sixth transistor M6, the seventh transistor M7, and the eighth transistor M8 may include a polysilicon semiconductor layer formed through a low temperature poly-silicon (LTPS) process as an active layer (channel). In addition, the first transistor M1, the second transistor M2, the fifth transistor M5, the sixth transistor M6, the seventh transistor M7, and the eighth transistor M8 may be P-type transistors (for example, p-channel metal-oxide-semiconductor (PMOS) transistors). Accordingly, a gate-on voltage that turns on the first transistor M1, the second transistor M2, the fifth transistor M5, the sixth transistor M6, the seventh transistor M7, and the eighth transistor M8 may be a logic low level. Since the polysilicon semiconductor transistor has a desired characteristics of a fast response speed, the polysilicon semiconductor transistor may be applied to a switching element desired to have fast switching characteristics.

In an embodiment, the third transistor M3 and the fourth transistor M4 may be formed of an oxide semiconductor transistor. For example, the third transistor M3 and the fourth transistor M4 may be N-type oxide semiconductor transistors (for example, n-channel metal-oxide semiconductor (NMOS) transistors) and may include an oxide semiconductor layer as an active layer. Accordingly, a gate-on voltage that turns on the third transistor M3 and the fourth transistor M4 may be a logic high level.

The oxide semiconductor transistor may be processed at a low temperature and has a charge mobility lower than that of the polysilicon semiconductor transistor. That is, the oxide semiconductor transistor has a high off current characteristic. Therefore, in an embodiment where the third transistor M3 and the fourth transistor M4 are formed of the oxide semiconductor transistor, a leakage current from the first node N1 due to low-frequency driving may be minimized, and thus display quality may be improved.

Figure 4:
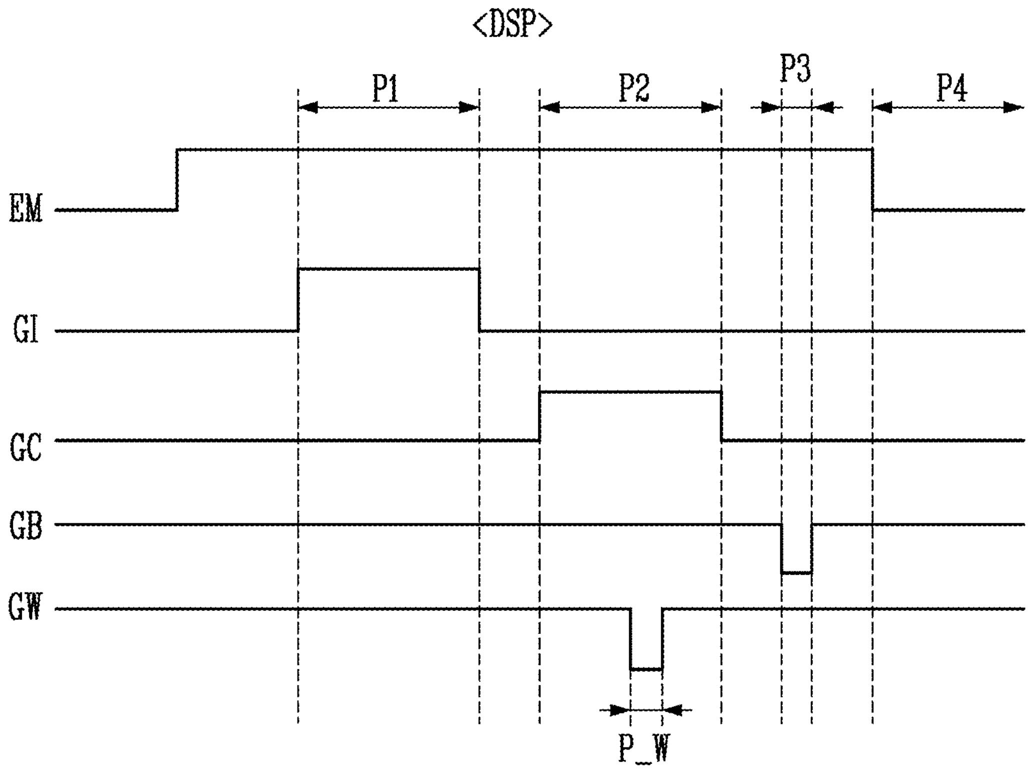
FIG. 4 is a waveform diagram illustrating an embodiment of a method of driving the pixel of FIG. 3 during a display scan period.

FIG. 4 is a waveform diagram illustrating an embodiment of a method of (or signals for) driving the pixel of FIG. 3 during the display scan period. The display scan period WP may be included in an active period of a frame.

Referring to FIGS. 3 and 4, the display scan period DSP may include a first period P1, a second period P2, a third period P3, and a fourth period P4. The first period P1 to the third period P3 may be set as a non-emission period, and the fourth period P4 may be set as an emission period.

The disable emission control signal EM may be supplied to the emission control line ELk during the first period P1 to the third period P3. When the disable emission control signal EM is supplied to the emission control line ELk, the sixth transistor M6 and the seventh transistor M7 are turned off. When the sixth transistor M6 and the seventh transistor M7 are turned off, an electrical connection of the first power line PL1 and the light emitting element LD is cut off, and thus the light emitting element LD is set to a non-emission state.

During the first period P1, the enable third scan signal GI is supplied to the third scan line SL3*i*. When the enable third scan signal GI is supplied to the third scan line SL3*i*, the third transistor M3 is turned on. When the third transistor M3 is turned on, the voltage of the first initialization power Vint1 of the third power line PL3 may be supplied to the first node N1.

During the second period P2, the enable second scan signal GC is supplied to the second scan line SL2*i*, and thus the fourth transistor M4 is turned on. When the fourth transistor M4 is turned on, the first transistor M1 may be connected in a diode form.

The enable first scan signal GW is supplied to the first scan line SL1*i* in a write period P_W overlapping the second period P2. When the enable first scan signal GW is supplied to the first scan line SL1*i*, the second transistor M2 is turned on. When the second transistor M2 is turned on, the data signal may be supplied from the data line DLj to the second node N2. Since the first transistor M1 maintains a diode-connected form by the turned-on fourth transistor M4, the first node N1 may have a voltage in which a threshold voltage of the first transistor M1 is compensated for in the data signal.

During the third period P3, the enable fourth scan signal GB is supplied to the fourth scan line SL4*i*. When the enable fourth scan signal GB is supplied to the fourth scan line SL4*i*, the fifth transistor M5 and the eighth transistor M8 are turned on. When the fifth transistor M5 is turned on, the voltage of the second initialization power Vint2 may be supplied to the first electrode of the light emitting element LD, and thus the light emitting element LD may be initialized. When the eighth transistor M8 is turned on, the voltage of the bias power Vbias is supplied to the second node N2. When the voltage of the bias power Vbias is supplied to the second node N2, the first transistor M1 may be set to the on bias state.

In the fourth period P4, the enable emission control signal EM (or a low level emission control signal) is supplied to the emission control line ELk, and thus the sixth transistor M6 and the seventh transistor M7 are turned on. When the sixth transistor M6 and the seventh transistor M7 are turned on, a current movement path to the second power line PL2 from the first power line PL1 via the sixth transistor M6, the first transistor M1, the seventh transistor M7, and the light emitting element LD is formed. At this time, according to an operation of the first transistor M1, the driving current corresponding to the voltage of the first node N1 may flow through the light emitting element LD, and the light emitting element LD may emit light having a luminance corresponding to the driving current.

Figure 5:
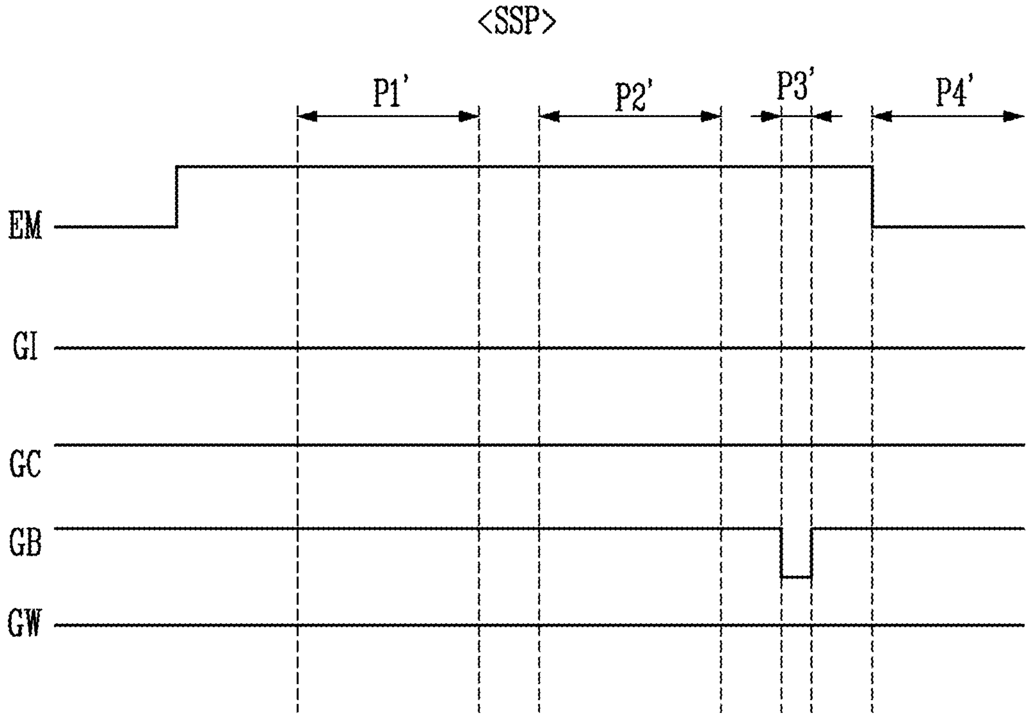
FIG. 5 is a waveform diagram illustrating an embodiment of a method of driving the pixel of FIG. 3 during a self-scan period.

FIG. 5 is a waveform diagram illustrating an embodiment of a method of (or signals for) driving the pixel of FIG. 3 during the self-scan period. The self-scan period SSP is a period in which light is emitted while maintaining the voltage of the previously supplied data signal, and the image is displayed again without switching to a next frame. In an embodiment, one frame may include one display scan period DSP and one or more self-scan periods SSP. One or more self-scan periods SSP may be disposed or defined successively after the display scan period DSP. The self-scan period may be included in a blank period of the frame.

In the self-scan period SSP, a threshold voltage compensation operation and a data writing operation may be omitted compared to the display scan period DSP, and an operation of applying a bias voltage to the first transistor M1 (and an operation of initializing the light emitting element LD) and a light emission operation may be performed. In an embodiment, the self-scan period SSP may be set to a length identical or similar to that of the display scan period DSP. In such an embodiment, the self-scan period SSP may include a first period P1', a second period P2', a third period P3', and a fourth period P4'.

Referring to FIGS. 3 and 5, the disable emission control signal EM is supplied to the emission control line Elk in the first period P1' to the third period P3'. When the disable emission control signal EM is supplied to the emission control line ELk, the sixth transistor M6 and the seventh transistor M7 are turned off, and thus the light emitting element LD is set to a non-emission state.

The enable first scan signal GW, the enable second scan signal GC, and the enable third scan signal GI are not supplied in the first period P1' to the third period P3' (alternatively, the disable scan signals GW, GC, and GI are supplied). Accordingly, in the first period P1' to the third period P3', the second transistor M2, the third transistor M3, and the fourth transistor M4 are set to a turn-off state.

The enable fourth scan signal GB may be supplied to the fourth scan line SL4*i* in the third period P3'. When the enable fourth scan signal GB is supplied to the fourth scan line SL4*i*, the fifth transistor M5 and the eighth transistor M8 may be turned on.

When the fifth transistor M5 is turned on, the voltage of the second initialization power Vint2 may be supplied to the first electrode of the light emitting element LD, and thus the light emitting element LD may be initialized. When the eighth transistor M8 is turned on, a voltage of the bias power Vbias is supplied to the second node N2. When the voltage of the bias power Vbias is supplied to the second node N2, the first transistor M1 may be set to an on-bias state.

The display device 100 according to an embodiment of the disclosure described above may be driven at various driving frequencies (various frame frequencies) because one frame includes the display scan period DSP and the self-scan period SSP.

Figure 6:
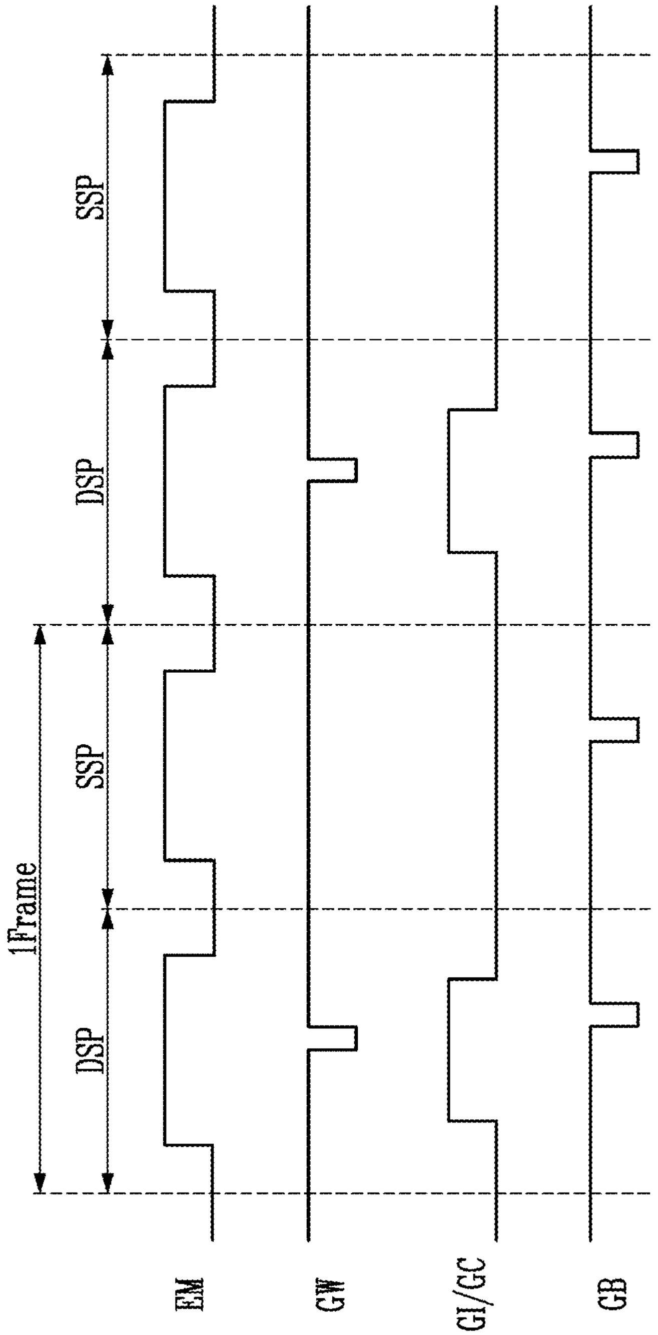
FIGS. 6 and 7 are diagrams illustrating an embodiment of signals supplied in an active period and a blank period.
Figure 7:
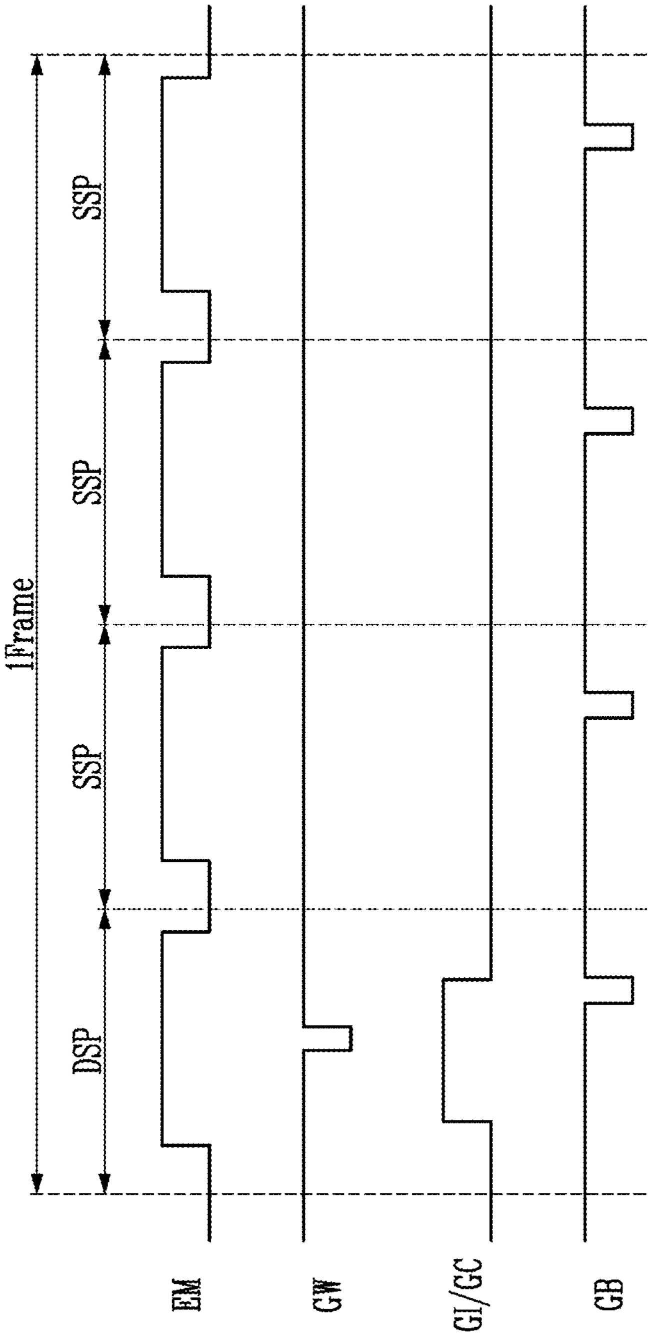

FIGS. 6 and 7 are diagrams illustrating an embodiment of signals supplied to the active period and the blank period. The scan signals GW, GC, GI, and GB shown in FIGS. 6 and 7 indicate supply-or-not in the display scan period DSP and the self-scan period SSP. The second scan signal GC and the third scan signal GI may be supplied from one scan driver, and thus are shown as one signal.

Referring to FIG. 6, one display scan period DSP and one self-scan period SSP may be included during one frame 1Frame. In the display scan period DSP, the emission control signal EM, the enable first scan signal GW, the enable second scan signal GC, the enable third scan signal GI, and the enable fourth scan signal GB may be supplied.

In the self-scan period SSP, the emission control signal EM and the enable fourth scan signal GB may be supplied. That is, the emission control signal EM and the enable fourth scan signal GB may be supplied in both of the display scan period DSP and the self-scan period SSP, and the remaining scan signals GW, GC, and GI may be supplied only in the display scan period DSP.

In an embodiment, as a driving frequency of the display device 100 is decreased (for example, low-frequency driving), the number of self-scan periods SSP included in one frame 1Frame period may be increased as shown in FIG. 7, and thus the number of times the emission control signal EM and the fourth enable scan signal GB are supplied in one frame 1Frame period may be increased.

In such an embodiment, the first scan signal GW, the second scan signal GC, and the third scan signal GI may be desired to maintain a high voltage (or a disabled state) during the self-scan period SSP to allow the display device 100 to be stably driven.

Figure 8:
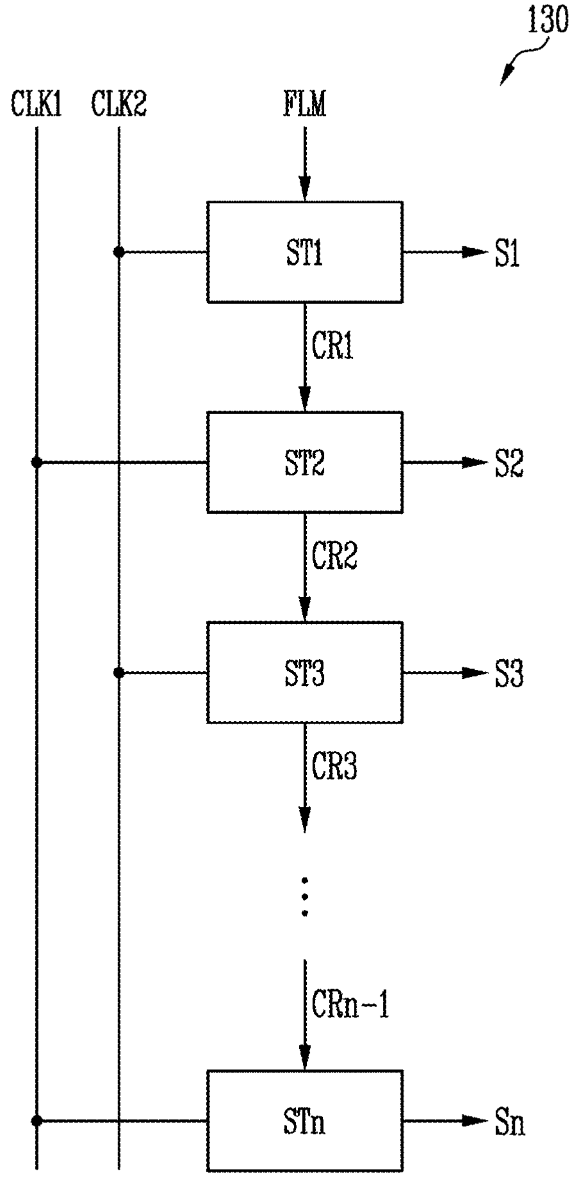
FIG. 8 is a diagram illustrating an embodiment of a scan driver shown in FIG. 1.

FIG. 8 is a diagram illustrating an embodiment of the scan driver shown in FIG. 1. FIG. 8 may be one of the first scan driver 132 to the fourth scan driver 138 shown in FIG. 2. In an embodiment, stage circuits ST1, ST2, ST3, . . . , and STn shown in FIG. 8 may be included in the emission driver 150.

Referring to FIG. 8, the scan driver 130 according to an embodiment of the disclosure may include the stage circuits ST1, ST2, ST3, . . . , and STn. Each of the stage circuits ST1 to STn may be connected to a corresponding one of scan lines S1, S2, S3, . . . , and Sn.

The stage circuits ST1 to STn may receive clock signals CLK1 and CLK2 from the timing controller 120. In an embodiment, for example, odd-numbered stage circuits ST1, ST3, . . . may receive the second clock signal CLK2, and even-numbered stage circuits ST2, . . . , and STn may receive the first clock signal. CLK1.

The first stage circuit ST1 receives a start signal FLM. The first stage circuit ST1 may output a scan signal to the first scan line S1 in response to the second clock signal CLK2. In addition, the first stage circuit ST1 may supply a carry signal CR1 to the next stage circuit ST2 in response to the second clock signal CLK2. Here, the carry signal CR1 may be replaced with the scan signal supplied to the first scan line S1.

The second stage circuit ST2 may receive the carry signal CR1, and output a carry signal CR2 to the next stage circuit ST3 simultaneously with outputting the scan signal to the second scan line S2 in response to the first clock signal CLK1. The stages ST1 to STn may sequentially output carry signals CR1, CR2, CR3, . . . , and CRn−1 while repeating the above-described operation, and sequentially output a scan signal to the scan lines S1, S2, S3, . . . , and Sn in response to the carry signals CR1, CR2, CR3, . . . , and CRn−1.

In an embodiment, as shown in FIG. 8, the two clock signals CLK1 and CLK2 are supplied to the scan driver 130, but an embodiment of the disclosure is not limited thereto. For example, according to a circuit configuration of the stage circuits ST1 to STn, signals (for example, a clock signal, a reset signal, or the like) supplied to the scan driver 130 may be variously set.

Figure 9A:
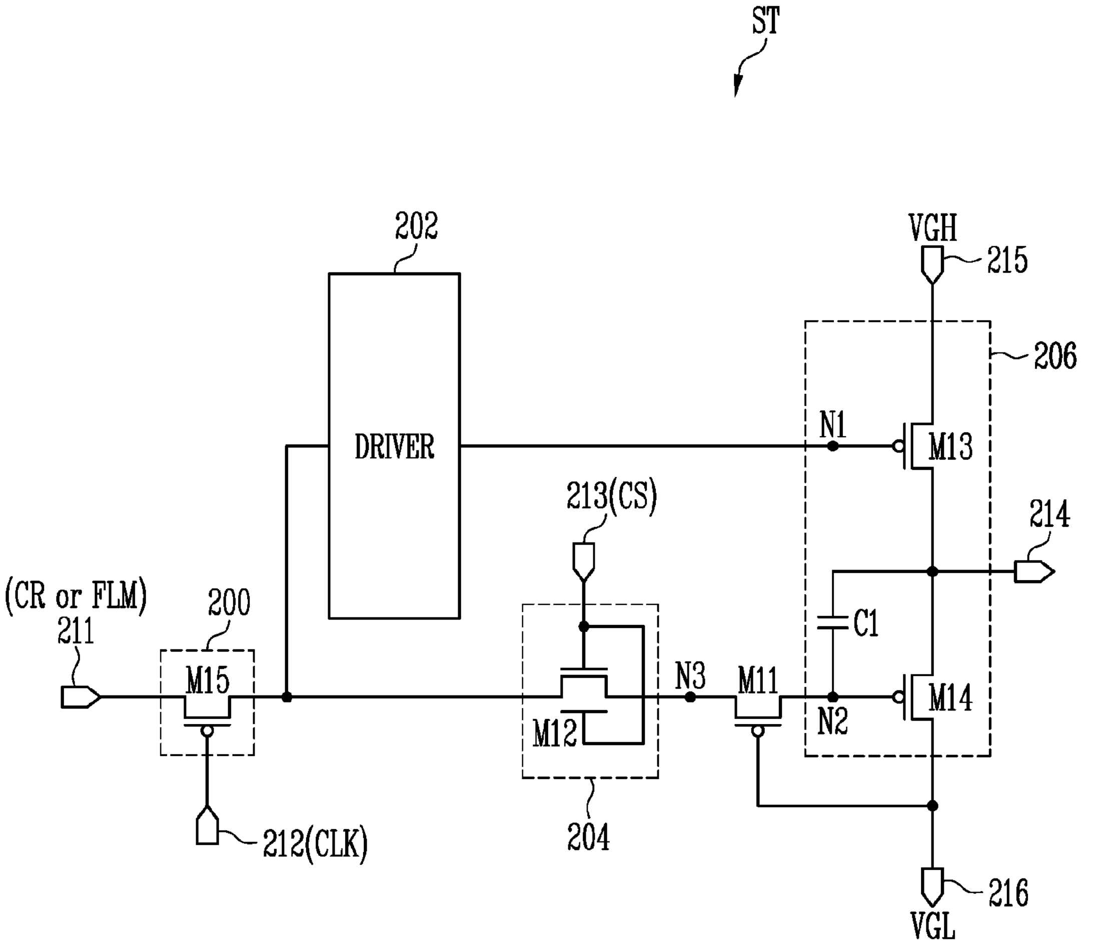
FIGS. 9A and 9B are diagrams illustrating an embodiment of a stage circuit shown in FIG. 8.
Figure 9B:
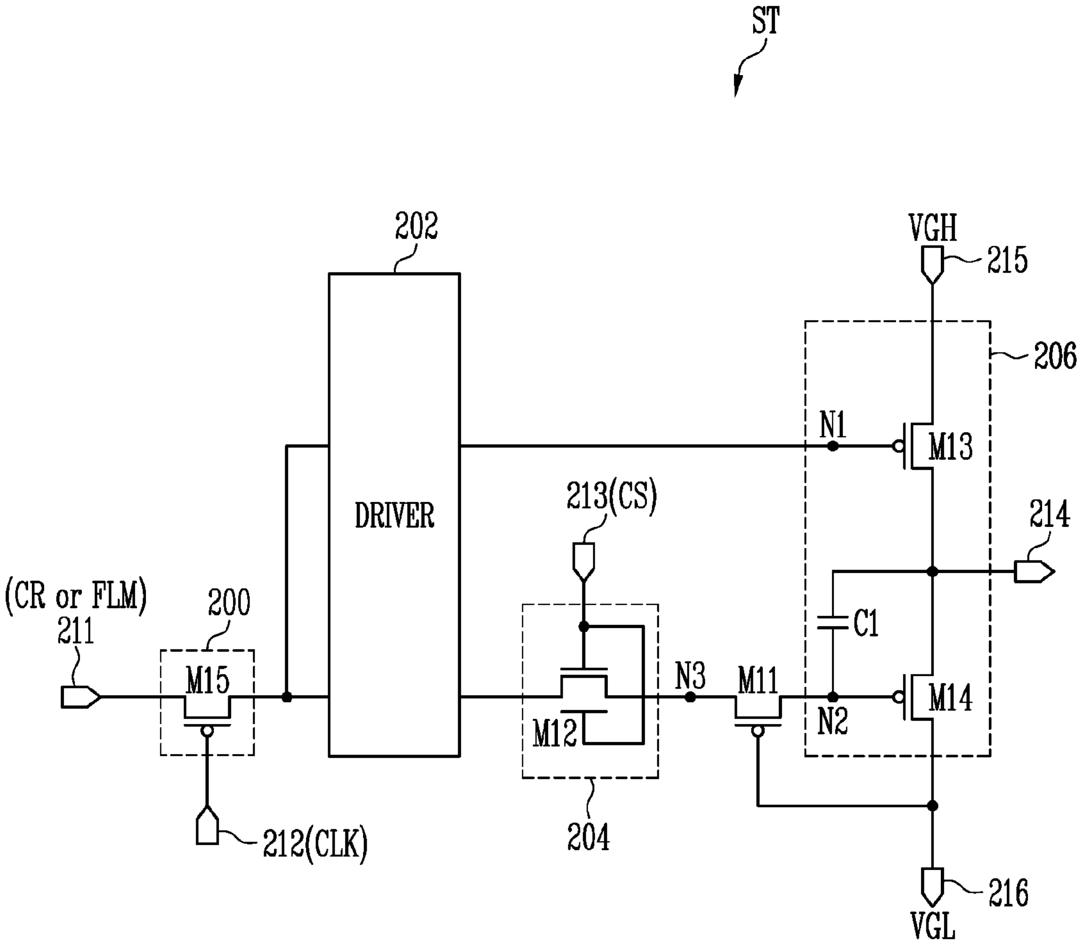

FIGS. 9A and 9B are diagrams illustrating an embodiment of the stage circuit shown in FIG. 8. In FIGS. 9A and 9B, for convenience of description, an embodiment of the stage circuit included in the second scan driver 134 (and/or the third scan driver 136) that outputs the second scan signal GC (and/or the third scan signal GI) is shown.

Referring to FIG. 9A, the stage circuit ST according to an embodiment of the disclosure may include an input unit 200, a driver 202, a controller 204, a first transistor M11, and an output unit 206.

The output unit 206 may control a voltage of an output terminal 214 in response to a voltage of the first node N1 and the second node N2. Here, a voltage of the output terminal 214 may be supplied to the second scan line SL2 as the second scan signal GC. For example, the enable second scan signal GC may be supplied when a first voltage VGH of a high level is supplied to the output terminal 214, and the disable second scan signal GC is supplied when a second voltage VGL of a low level is supplied.

The output unit 206 may include a third transistor M13, a fourth transistor M14, and a first capacitor C1. The third transistor M13 may be connected between a first power input terminal 215 and the output terminal 214. A gate electrode of the third transistor M13 may be connected to the first node N1. The third transistor M13 may control an electrical connection of the first power input terminal 215 and the output terminal 214 while turning on or off in response to the voltage of the first node N1. The first power input terminal 215 may receive the first voltage VGH. The first voltage VGH may be set to a high level voltage.

The fourth transistor M14 may be connected between the output terminal 214 and a second power input terminal 216. A gate electrode of the fourth transistor M14 may be connected to the second node N2. The fourth transistor M14 may control an electrical connection of the second power input terminal 216 and the output terminal 214 while turning on or off in response to the voltage of the second node N2. The second power input terminal 216 may receive the second voltage VGL. The second voltage VGL may be set to a low level voltage lower than the first voltage VGH.

The first capacitor C1 may be connected between the output terminal 214 and the second node N2. This first capacitor C1 may control the voltage of the second node N2 in response to a voltage of the output terminal 214. That is, the first capacitor C1 may be driven as a coupling capacitor.

The first transistor M11 may be connected between the second node N2 and the third node N3 (or the controller 204). A gate electrode of the first transistor M1 may be connected to the second power input terminal 216. The first transistor M1 may be set as a P-type transistor, and thus may be set to a turn-on state during a period in which the display device 100 is driven (or a driving period).

The first transistor M11 may be set to a turn-on state and may electrically connect the second node N2 and the third node N3 to each other. When the first transistor M11 is set to the turn-on state, a voltage of the third node N3 may have a voltage equal to or higher than the second voltage VGL regardless of a voltage drop of the second node N2. That is, the first transistor M11 may effectively prevent the voltage of the third node N3 from decreasing to a voltage equal to or lower than the second voltage VGL.

The controller 204 may be connected between the third node N3 (or the first transistor M11) and the input unit 200. The controller 204 may control an electrical connection between the input unit 200 and the second node N2. In an embodiment, the controller 204 may include a second transistor M12 (or a control transistor). The second transistor M12 may be positioned between the input unit 200 and the third node N3, and a gate electrode thereof may be connected to a control input terminal 213. The second transistor M12 may be turned on or off in response to a control signal CS supplied to the control input terminal 213.

The second transistor M12 may further include a second gate electrode. The second gate electrode may be connected to the control input terminal 213 (for example, a source sink transistor). In such an embodiment where the second gate electrode is connected to the control input terminal 213, an on current of the second transistor M12 may be increased.

The input unit 200 may be connected between the first input terminal 211 and the controller 204. The input unit 200 may control an electrical connection of the first input terminal 211 and the controller 204. In an embodiment, the input unit 200 may include a fifth transistor M15.

The fifth transistor M15 may be connected between the first input terminal 211 and the controller 204, and a gate electrode may be connected to a second input terminal 212. The first input terminal 211 may receive the carry signal CR or the start signal FLM of the previous stage circuit. The second input terminal 212 may receive the clock signal CLK. The fifth transistor M15 may supply the carry signal CR or the start signal FLM to the controller 204 and the driver 202 in response to the clock signal CLK input to the second input terminal 212.

The driver 202 may control the voltage of the first node N1 in response to the carry signal CR or the start signal FLM of the input unit 200. The driver 202 may be positioned between the input unit 200 and the first node N1. In another embodiment, for example, the driver 202 may also be positioned or connected between the controller 204 and the input unit 200 as shown in FIG. 9B. In an embodiment, the driver 202 may include an inverter, but the disclosure is not limited thereto.

The stage circuit ST according to an embodiment of the disclosure may include the first transistor M11 and the controller 204, and may further include or be configured of various currently known circuits. In an embodiment, for example, the stage circuit ST may include the first transistor M11, the controller 204, the input unit 200, the driver 202, and the output unit 206, and may further include be configured of various currently known circuits.

Figure 10:
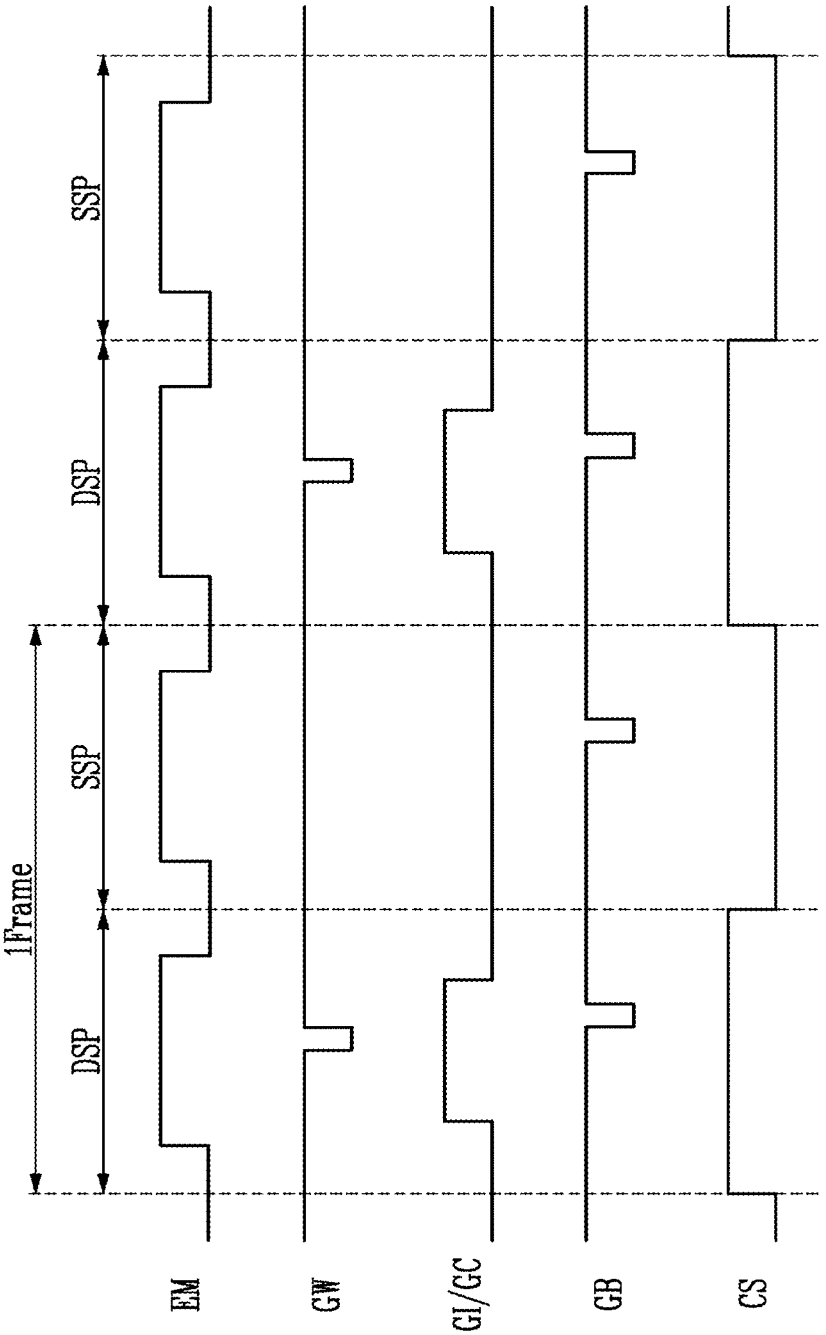
FIG. 10 is a diagram illustrating a waveform diagram corresponding to a driving method of an embodiment of the stage circuit shown in FIGS. 9A and 9B.
Figure 11:
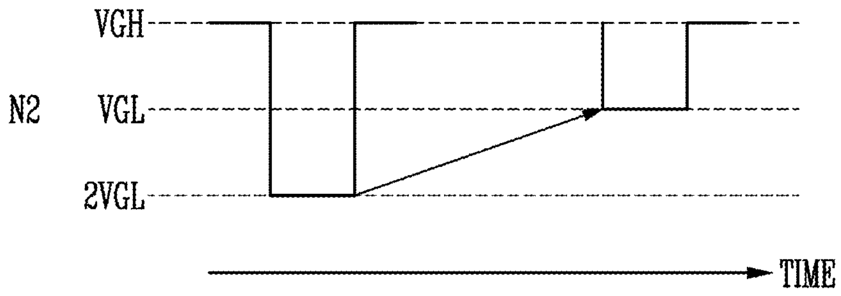
FIG. 11 is a diagram illustrating a voltage of a second node when a controller is not included in the stage circuit.

FIG. 10 is a diagram illustrating a waveform diagram corresponding to a driving method of (or signals for driving) an embodiment of the stage circuit shown in FIGS. 9A and 9B. FIG. 11 is a diagram illustrating the voltage of the second node in a case where a controller is not included in the stage circuit. The scan signals GW, GC, GI, and GB shown in FIG. 10 indicate supply-or-not in the display scan period DSP and the self-scan period SSP. The second scan signal GC and the third scan signal GI may be supplied from one scan driver, and thus are shown as one signal.

Referring to FIGS. 9A to 10, the control signal CS may be set to a high level voltage during the display scan period DSP (or the active period), and may be set to a low level voltage during the self-scan period SSP (or the blank period).

During the display scan period DSP in which the high level control signal CS is supplied, the second transistor M12 may be set to a turn-on state, and thus the input unit 200 and the third node N3 may be electrically connected to each other. In this case, the stage circuit ST may be driven normally during the display scan period DSP.

During the self-scan period SSP in which the low level control signal CS is supplied, the second transistor M12 may be set to a turn-off state, and thus the input unit 200 and the third node N3 may be electrically blocked or disconnected from each other. In this case, a current leaking from the second node N2 to the input unit 200 may be minimized, and thus stability of driving may be secured.

As described above, the stage circuit ST may be included in the second scan driver 134 (and/or the third scan driver 136) that outputs the second scan signal GC (and/or the third scan signal GI). The second scan driver 134 sequentially outputs the enable scan signal GC during the display scan period DSP, and supplies the disable second scan signal GC (that is, a low voltage) to the output terminal 214 while maintaining the voltage of the second node N2 during the self-scan period SSP.

When the high level control signal CS is supplied during the display scan period DSP, the second transistor M12 may be set to a turn-on state, and the second scan driver 134 may normally output the enable second scan signal GC.

When the low level control signal CS is supplied during the self-scan period SSP, the second transistor M12 may be set to a turn-off state, and a leakage current of the second node N2 may be minimized. In this case, the second scan driver 134 may stably output the disable second scan signal GC.

In such an embodiment, when supply of the enable second scan signal GC is stopped, the voltage of the second node N2 may be set to approximately the second voltage VGL. At this time, when the fourth transistor M14 is turned on, the second voltage VGL may be output to the output terminal 214. Here, the second voltage VGL may be supplied to the second scan line SL2 as the disable second scan signal GC.

In such an embodiment, when the second voltage VGL is supplied to the output terminal 214, the voltage of the second node N2 may be decreased to approximately a fourth voltage 2VGL as shown in FIG. 11 due to coupling of the first capacitor C1. The fourth voltage 2VGL may be set to a voltage approximately two times lower than the second voltage VGL. When the second node N2 is set to the fourth voltage 2VGL, the fourth transistor M14 may stably maintain a turn-on state.

For example, in a case where the controller 204 is not included in the stage circuit ST, the voltage of the second node N2 may be increased to the second voltage VGL over time due to a leakage current. When the voltage of the second node N2 is increased to the second voltage VGL, the fourth transistor M14 may be turned off, and thus reliability of driving may be reduced.

In an embodiment of the disclosure, the controller 204 is included in the stage circuit ST, such that the leakage current flowing from the second node N2 to the input unit 200 may be effectively blocked, and thus the voltage of the second node N2 may be maintained as the fourth voltage 2VGL during the self-scan period SSP.

Figure 12A:
FIGS. 12A and 12B are diagrams illustrating an embodiment of a voltage of a control signal.
Figure 12B:

FIGS. 12A and 12B are diagrams illustrating an embodiment of a voltage of the control signal.

Referring to FIG. 12A, the high level voltage of the control signal may be set as the first voltage VGH, and the low level voltage of the control signal CS may be set as a third voltage VGL2. The third voltage VGL2 may be set to a voltage lower than the second voltage VGL.

Figure 13:
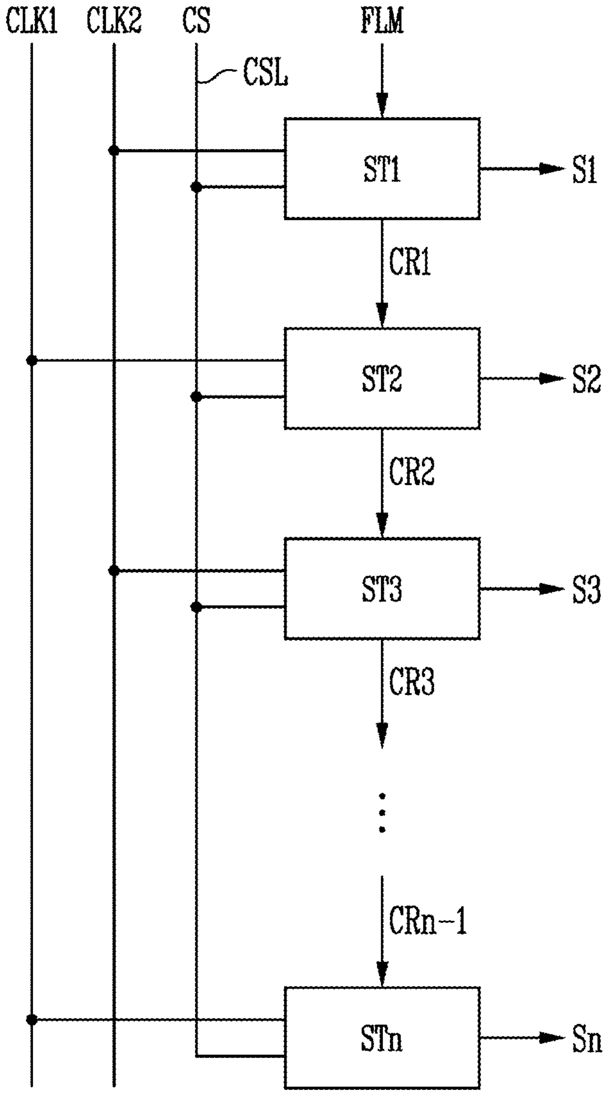
FIG. 13 is a diagram illustrating an embodiment of the scan driver of FIG. 1.

When the low level voltage of the control signal CS is set to the third voltage VGL2, the second transistor M2 may be stably turned off regardless of a threshold voltage deviation of the second transistor M2. In addition, the low level voltage of the control signal CS may be set to the second voltage VGL. FIG. 13 is a diagram illustrating an embodiment of the scan driver of FIG. 1. In description of FIG. 13, any repetitive detailed description of the same or like elements as those described above with reference to FIG. 8 will be omitted.

Referring to FIG. 13, the control signal CS may be supplied to the stage circuits ST1 to STn via a control line CSL. The control line CSL may be commonly connected to the stage circuits ST1 to STn. The control line CSL may supply the control signal CS input from the timing controller 120 to the stage circuits ST1 to STn.

In such an embodiment, as described above, the control signal CS may be set to the high level voltage during the display scan period DSP and may be set to the low level voltage during the self-scan period SSP.

Figure 14:
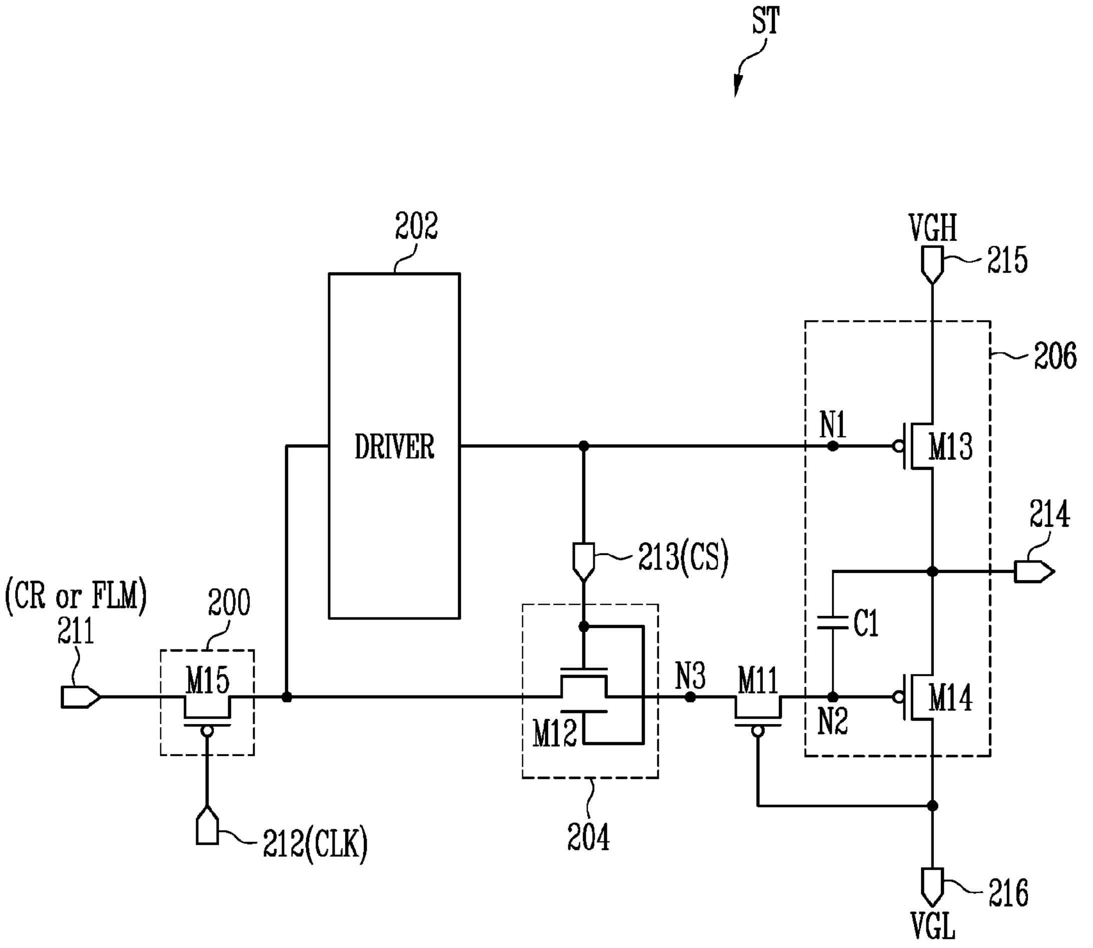
FIG. 14 is a diagram illustrating an embodiment of the stage circuit shown in FIG. 8.

FIG. 14 is a diagram illustrating an embodiment of the stage circuit shown in FIG. 8. In description of FIG. 14, any repetitive detailed description of the same or like elements as those described above with reference to FIG. 9A will be omitted.

Referring to FIG. 14, in an embodiment of the disclosure, the control input terminal 213 (or the gate electrode of the second transistor M12) included in the stage circuit ST may be connected to the first node N1.

The voltage of the first node N1 may be set to a high level during a period in which an enable scan signal (for example, GC) is supplied. When the voltage of the first node N1 is set to the high level voltage, the first voltage VGH may be supplied to the output terminal 214, and thus the enable scan signal may be supplied to the output terminal 214.

In such an embodiment, the voltage of the first node N1 may maintain the high voltage until the low level voltage is supplied to the second node N2 and may be set to the low level voltage during another period. In this case, the second transistor M12 may be turned off after the low level voltage is supplied to the second node N2.

That is, in such an embodiment where the gate electrode of the second transistor M12 is connected to the first node N1, the second transistor M12 may be turned on during a period in which the enable scan signal is supplied to the output terminal 214 and may be turned off during a period in which the disable scan signal is supplied. In this case, a leakage current of the second node N2 may be stably blocked without supplying a separate control signal CS.

In such an embodiment, where the gate electrode of the second transistor M12 is connected to the first node N1, the second transistor M12 included in each of the stage circuits ST1 to STn may be sequentially turned on and off. In this case, the stage circuit ST may be applied to each of the first scan driver 132, the second scan driver 134, the third scan driver 136, and the fourth scan driver 138.

Figure 15:
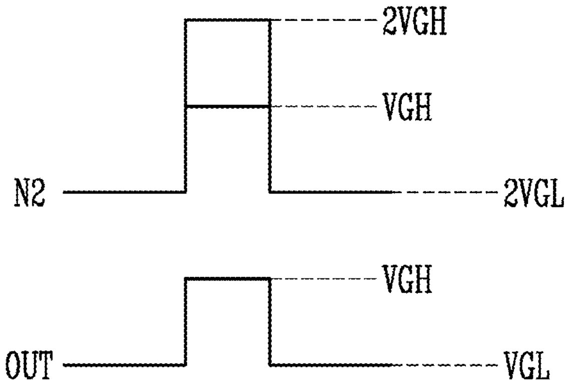
FIG. 15 is a diagram illustrating a voltage of a second node included in the stage circuit.

FIG. 15 is a diagram illustrating the voltage of the second node included in the stage circuit. FIG. 15 may illustrate the voltage of the second node N2 in a case where the first transistor M1 and the second transistor M2 are set to different types of transistors, for example, a case where the first transistor M1 is a P-type transistor and the second transistor M2 is an N-type transistor.

Referring to FIGS. 9A and 15, after the fourth transistor M14 is turned off, the first voltage VGH may be supplied to the output terminal 214. That is, after the first voltage VGH is supplied to the second node N2, the first voltage VGH may be supplied to the output terminal 214. When the first voltage VGH is supplied to the output terminal 214, the second node N2 may be boosted to a fifth voltage 2VGH which is approximately twice the first voltage VGH due to the coupling of the first capacitor C1.

Here, in a case where the second transistor M12 is not included in the stage circuit ST, the fifth voltage 2VGH may be gradually decreased to the first voltage VGH. In an embodiment of the disclosure, the second transistor M12 is included in the stage circuit ST, such that the voltage of the second node N2 may maintain the fifth voltage 2VGH.

In such an embodiment, the second node N2 is set to the fifth voltage 2VGH, such that the fourth transistor M14 may be stably set to a turn-off state regardless of the threshold voltage, and thus reliability of driving may be secured. In addition, since the voltage of the second node N2 is boosted by the first capacitor C1, a voltage of the carry signal CR or the start signal FLM input to the first input terminal 211 may be decreased, and thus power consumption may be reduced.

In such an embodiment, the second voltage VGL is supplied to the output terminal 214, such that the voltage of the second node N2 may be decreased to approximately the fourth voltage 2VGL due to the coupling of the first capacitor C1. The fourth voltage 2VGL may be set to a voltage approximately two times lower than the second voltage VGL. In such an embodiment where the second node N2 is set to the fourth voltage 2VGL, the fourth transistor M14 may stably maintain a turn-on state.

Figure 16A:
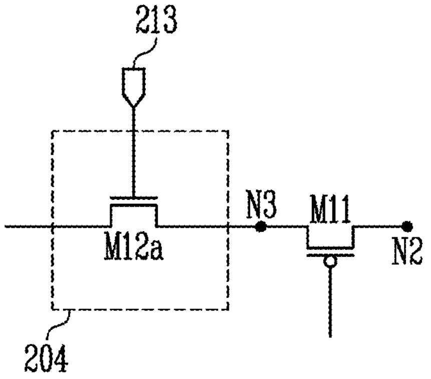
FIGS. 16A to 16C are diagrams illustrating an embodiment of a transistor included in the controller.
Figure 16B:
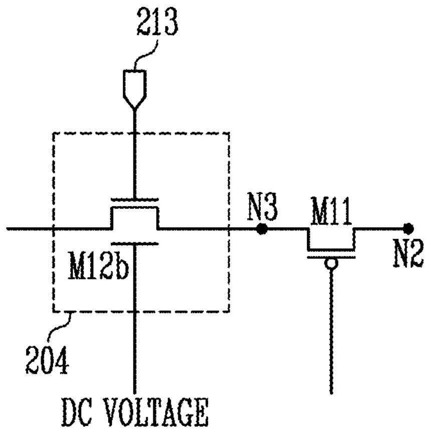
Figure 16C:
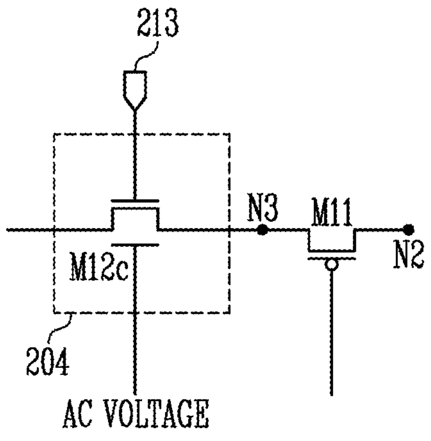

FIGS. 16A to 16C are diagrams illustrating an embodiment of a transistor included in the controller.

Referring to FIGS. 16A to 16C, in other embodiments, the second transistor M12*a*, M12*b*, or M12*c* included in the controller 204 may be set as a N-type transistor, differently from the first transistor M11 which is set as a P-type transistor. In an embodiment, as shown in FIG. 16A, the second transistor M12*a* may be set as a general three-terminal transistor.

In an embodiment, as shown in FIGS. 16B and 16C, the second transistor M12*b* or M12*c* may include a second gate electrode. The second gate electrode may receive a direct current (DC) voltage or an alternating current (AC) voltage.

In an embodiment where the DC voltage is supplied to the second gate electrode, an on current may be increased compared to the three-terminal transistor simultaneously with controlling a threshold voltage of the second transistor M12*b*. Here, the DC voltage may be set to one of voltages supplied to the stage circuit ST. For example, the DC voltage may be set to one of the first voltage VGH, the second voltage VGL, and the third voltage VGL2.

In an embodiment where the AC voltage is supplied to the second gate electrode, an on current may be increased compared to a case where the DC voltage is supplied simultaneously with controlling a threshold voltage of the second transistor M12*c*.

Figure 17A:
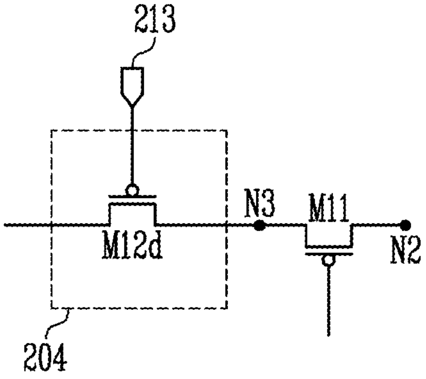
FIGS. 17A to 17C are diagrams illustrating an embodiment of a transistor included in the controller.
Figure 17B:
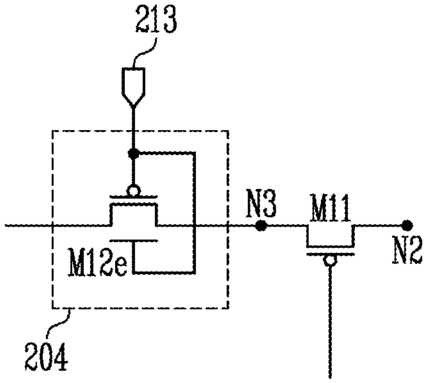
Figure 17C:
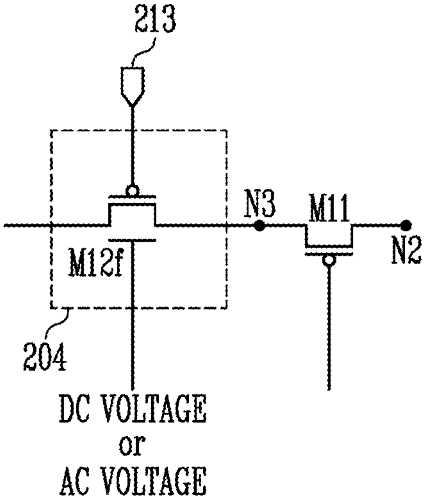

FIGS. 17A to 17C are diagrams illustrating an embodiment of a transistor included in the controller.

Referring to FIGS. 17A to 17C, in other embodiments, the second transistors M12*d*, M12*e*, or M12*f* included in the controller 204 may be set as a P-type transistor identically to the first transistor M11.

In an embodiment, the second transistor M12*d* may be formed as a three-terminal transistor as shown in FIG. 17A. In an embodiment, the second transistor M12*e* may include a second gate electrode as shown in FIG. 17B, and the second gate electrode may be connected to the control input terminal 213. In an embodiment, the second transistor M12*f* may include a second gate electrode as shown in FIG. 17C, and the second gate electrode may receive a DC voltage or an AC voltage.

In addition, although not separately shown, the second transistor M12*d*, M12*e*, or M12*f* included in the controller 204 may be set as a N-type transistor identically to the first transistor M11.

Figure 18A:
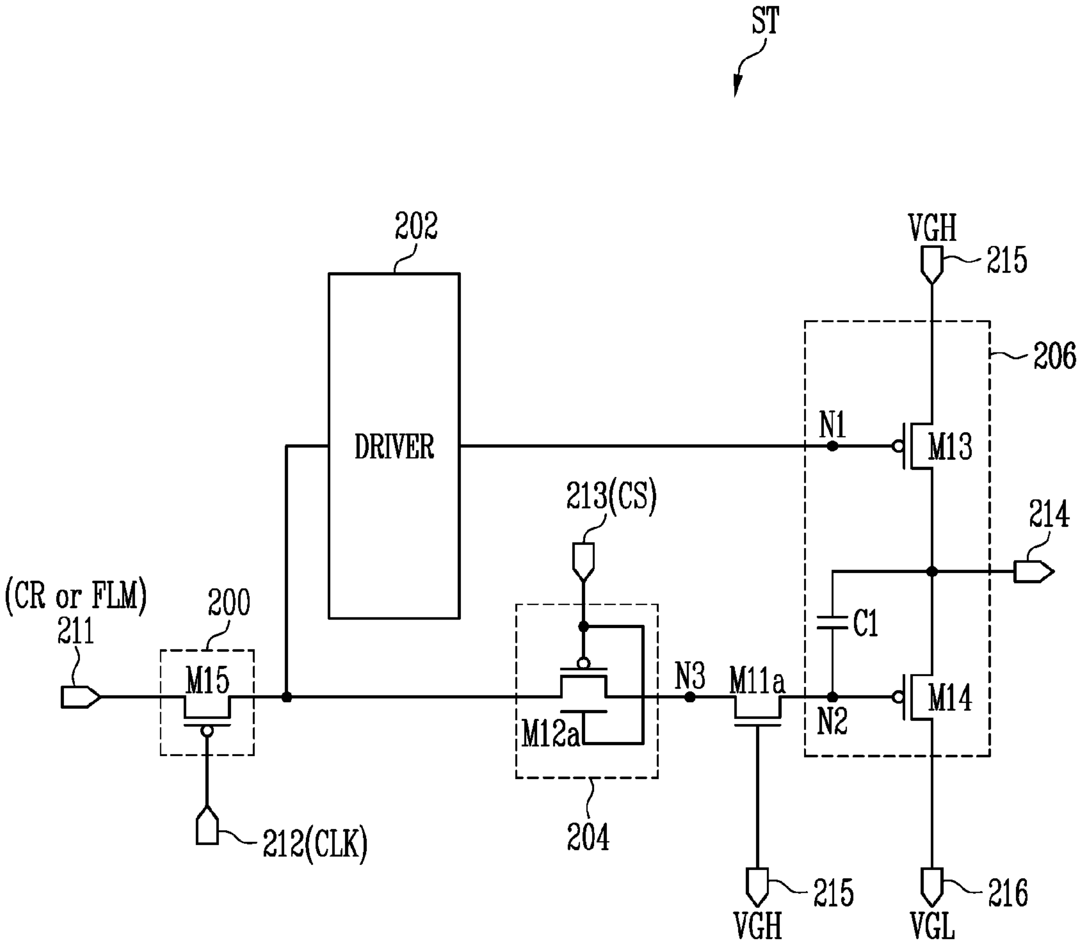
FIGS. 18A and 18B are diagrams illustrating a stage circuit according to an embodiment of the disclosure.
Figure 18B:
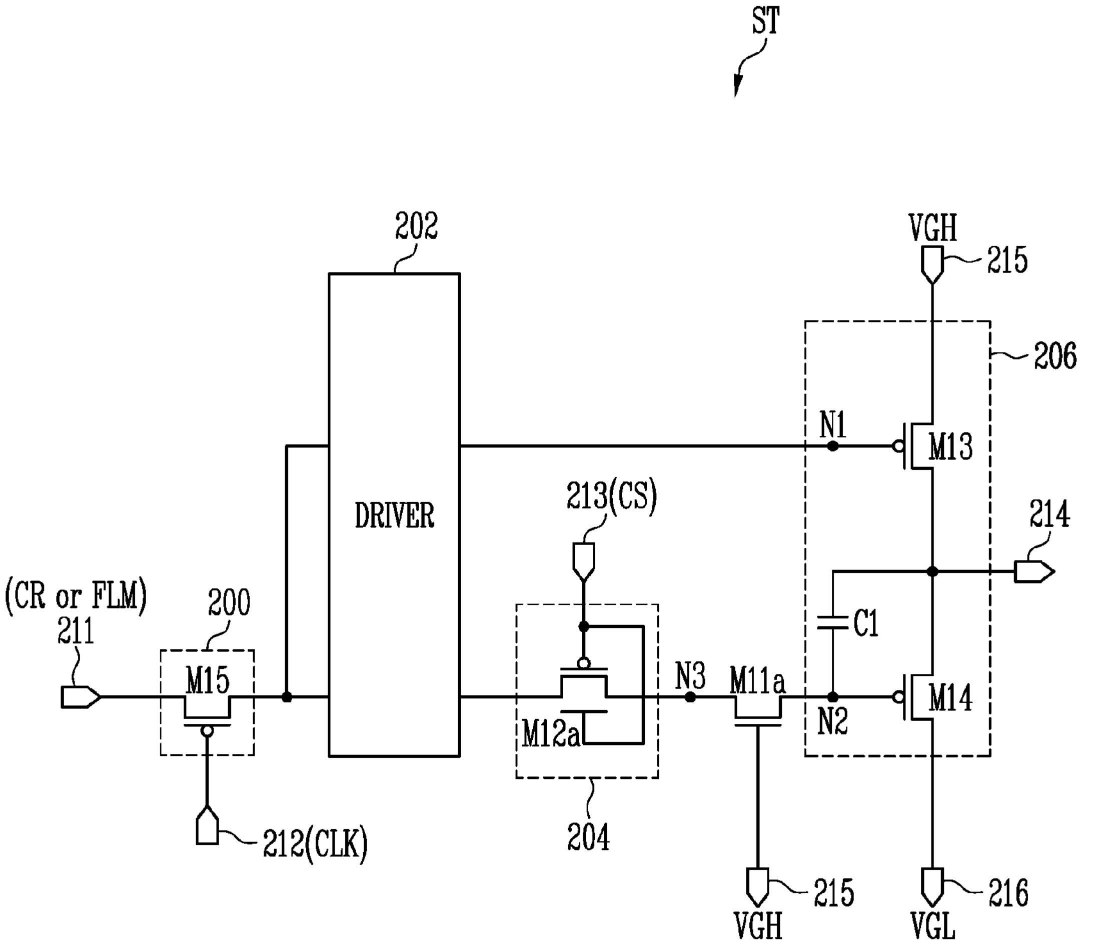

FIGS. 18A and 18B are diagrams illustrating a stage circuit according to an embodiment of the disclosure. In description of FIGS. 18A and 18B, the same reference numerals are assigned to the same elements as those of FIGS. 9A and 9B, and any repetitive detailed description thereof will be omitted.

Referring to FIGS. 18A and 18B, in an embodiment, a first transistor M11*a* may be set as an N-type transistor. In this case, a gate electrode of the first transistor M11*a* may be connected to the first power input terminal 215, and may maintain a turn-on state by the first voltage VGH during the driving period. In such an embodiment, a second transistor M12*a* included in the controller 204 may be set as an N-type transistor, and a second gate electrode may be connected to the control input terminal 213. However, the disclosure is not limited thereto, and various types of transistors may be included in the controller 204 as described with reference to FIGS. 16A to 17C.

Figure 19:
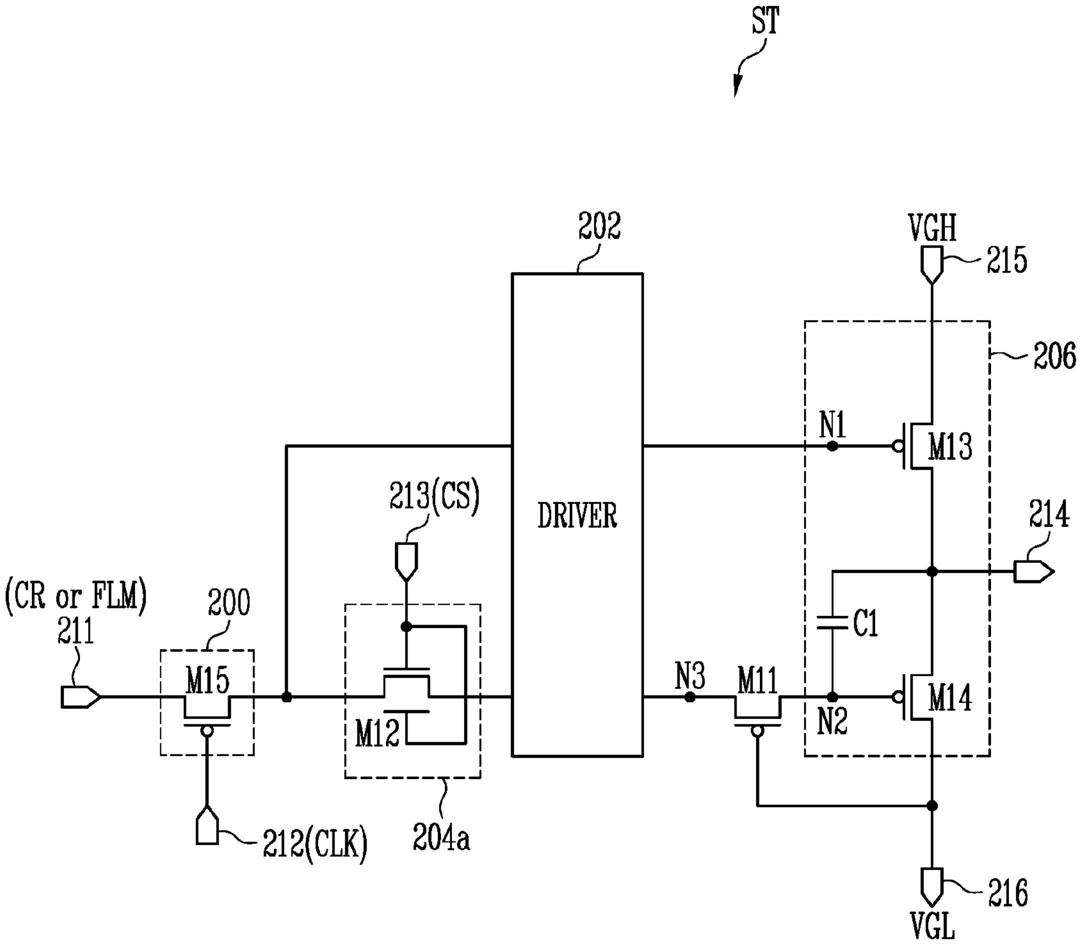
FIG. 19 is a diagram illustrating a stage circuit according to an embodiment of the disclosure.

FIG. 19 is a diagram illustrating a stage circuit according to an embodiment of the disclosure. In description of FIG. 19, the same reference numerals are assigned to the same elements as those of FIG. 9B, and any repetitive detailed description thereof will be omitted.

Referring to FIG. 19, a controller 204*a* of the stage circuit ST according to an embodiment of the disclosure may be positioned or connected between the driver 202 and the input unit 200. The driver 202 may include various types of currently known circuits. In an embodiment, for example, the driver 202 may include an inverter. Even though the controller 204*a* is positioned between the driver 202 and the input unit 200, the controller 204*a* may be turned off during the self-scan period SSP in response to the control signal CS, and thus a leakage current from the second node N2 or (the third node N3) may be prevented.

In such an embodiment, the control input terminal 213 may be connected to the first node N1, and thus the leakage current from the second node N2 may be effectively prevented. Various types of transistors may be included in the controller 204*a* as described with reference to FIGS. 16A to 17C.

Figure 20:
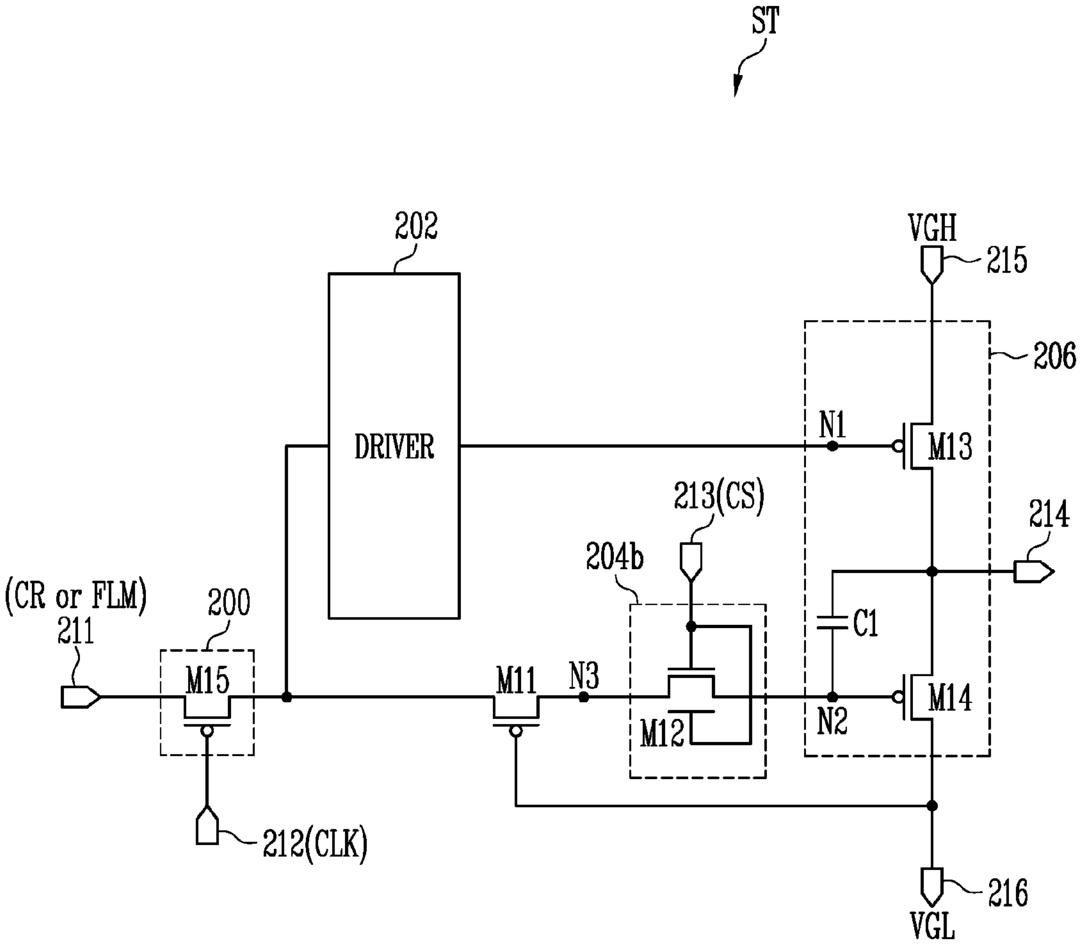
FIG. 20 is a diagram illustrating a stage circuit according to an embodiment of the disclosure.

FIG. 20 is a diagram illustrating a stage circuit according to an embodiment of the disclosure. In description of FIG. 20, the same reference numerals are assigned to the same elements as those of FIG. 9A, and any repetitive detailed description thereof will be omitted.

Referring to FIG. 20, the controller 204*b* of the stage circuit ST according to an embodiment of the disclosure may be positioned or connected between the first transistor M11 (for example, the third node N3) and the second node N2. In this case, the same function as the controller 204 of FIG. 9A may be performed. Various types of transistors may be included in the controller 204*b* as described with reference to FIGS. 16A to 17C.

Figure 21:
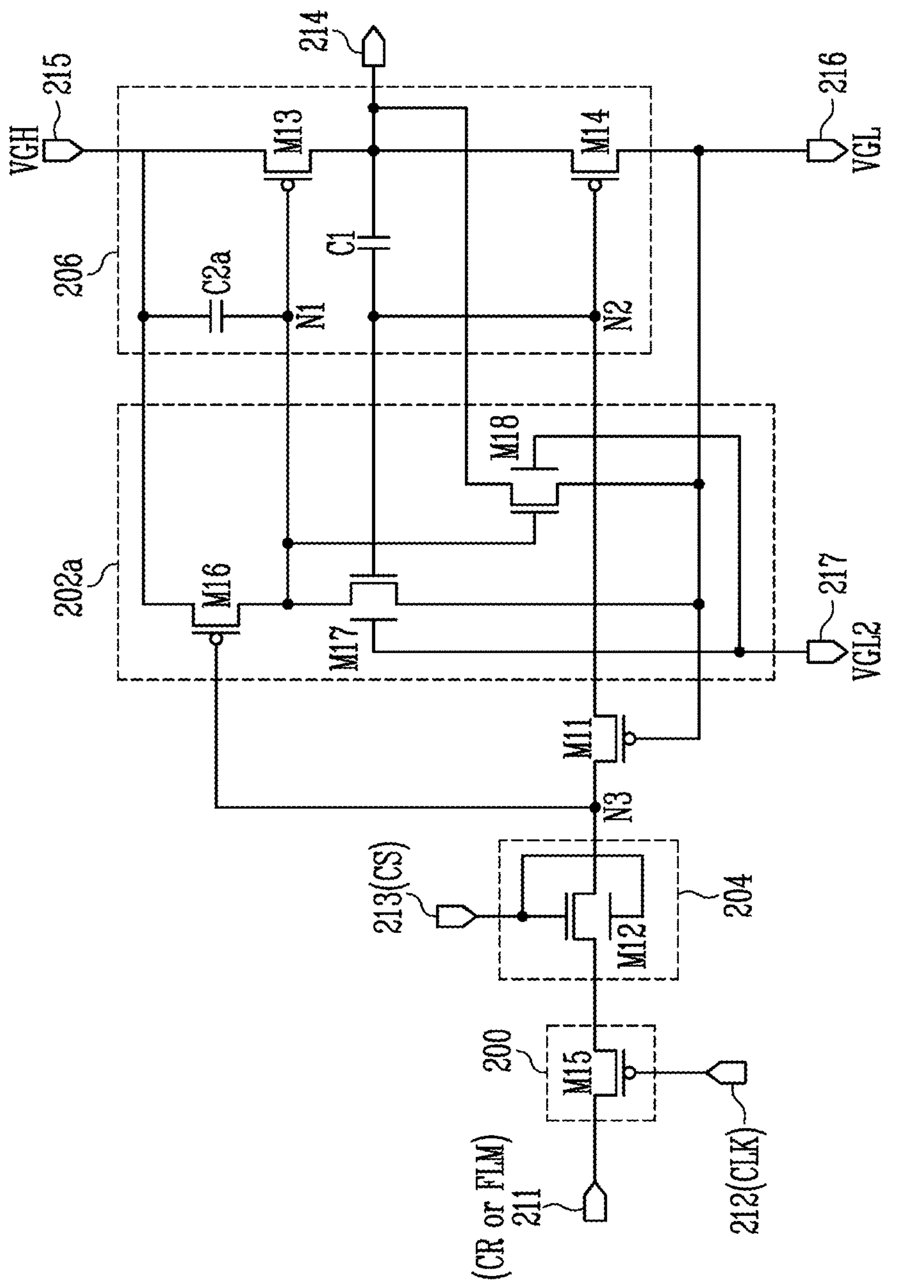
FIGS. 21 and 22 are diagrams illustrating a stage circuit according to an embodiment of the disclosure.
Figure 22:
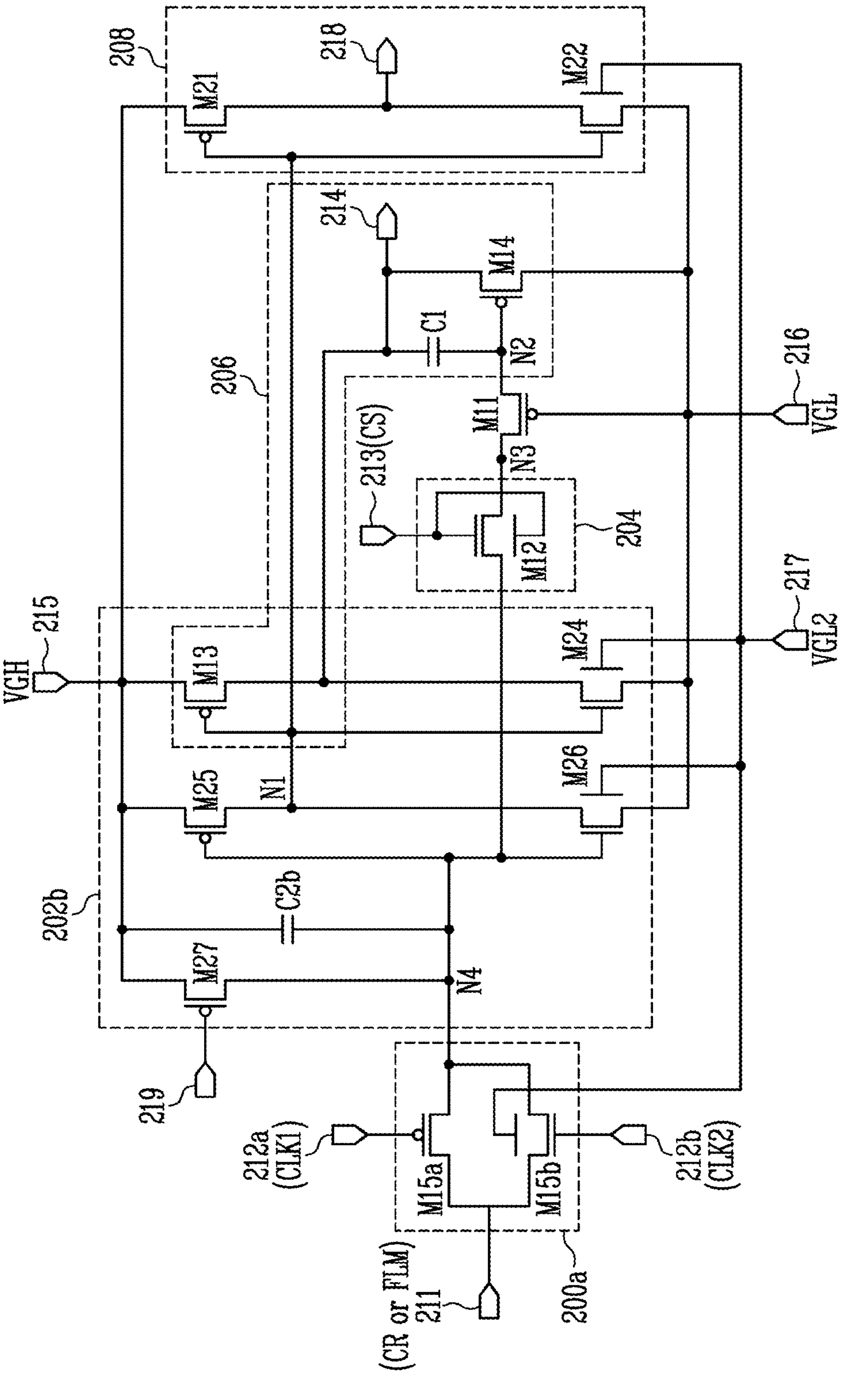

FIGS. 21 and 22 are diagrams illustrating a stage circuit according to an embodiment of the disclosure. In the disclosure, the stage circuit ST may include various currently known types to include the first transistor M11 and the controller 204 as described above. FIGS. 21 and 22 illustrate an embodiment of the stage circuit ST including the first transistor M11 and the controller 204.

Referring to FIG. 21, a driver 202*a* of the stage circuit ST according to an embodiment of the disclosure may include a sixth transistor M16, a seventh transistor M17, and an eighth transistor M18 . . . .

The sixth transistor M16 may be connected between the first power input terminal 215 and the first node N1. In addition, a gate electrode of the sixth transistor M16 may be connected to the third node N3.

The seventh transistor M17 may be connected between the first node N1 and the second power input terminal 216. In addition, a gate electrode of the seventh transistor M17 may be connected to the second node N2.

The eighth transistor M18 may be connected between the output terminal 214 and the second power input terminal 216. In addition, a gate electrode of the eighth transistor M18 may be connected to the first node N1. Each of the seventh transistor M17 and the eighth transistor M18 may further include a second gate electrode, and the second gate electrode thereof may be connected to a third power input terminal 217 to which the third voltage VGL2 is supplied. Additionally, the sixth transistor M16 may be set as a P-type transistor, and the seventh transistor M17 and the eighth transistor M18 may be set as N-type transistors.

The second transistor M12 may be set to a turn-on state in response to the high level control signal CS during the display scan period DSP. The first transistor M11 may maintain the turn-on state during the driving period including the display scan period DSP and the self-scan period SSP.

In an operation process, the carry signal CR or the start signal FLM may be input to the first input terminal 211, and the clock signal CLK may be input to the second input terminal 212. In this case, the fifth transistor M15 may be turned on, and thus a high level voltage (that is, the carry signal CR or the start signal FLM) may be supplied to the third node N3 and the second node N2.

When the high level voltage is supplied to the third node N3, the sixth transistor M6 is turned off. When the high level voltage is supplied to the second node N2, the fourth transistor M14 is turned off and the seventh transistor M17 is turned on. When the seventh transistor M17 is turned on, the second voltage VGL may be supplied to the first node N1, and thus the third transistor M13 may be turned on. In this case, the first voltage VGH (or the enable scan signal) may be supplied to the output terminal 214.

After the first voltage VGH is supplied to the output terminal 214, supply of the carry signal CR or the start signal FLM to the first input terminal 211 is stopped, and in this case, the first input terminal 211 is set to the low level voltage. When the clock signal CLK is input to the second input terminal 212, the low level voltage may be supplied to the third node N3 and the second node N2.

When the low level voltage is supplied to the third node N3, the sixth transistor M16 is turned on, and thus the first voltage VGH is supplied to the first node N1. When the first voltage VGH is supplied to the first node N1, the third transistor M13 is turned off and the eighth transistor M18 is turned on. When the eighth transistor M18 is turned on, the second voltage VGL is supplied to the output terminal 214. When the low level voltage is supplied to the second node N2, the fourth transistor M14 is turned on and the seventh transistor M17 is turned off. When the fourth transistor M14 is turned on, the second voltage VGL is supplied to the output terminal 214.

Referring to FIG. 22, another embodiment of the stage circuit ST may include an input unit 200*a*, a driver 202*b*, the controller 204, an output unit (or a first output unit) 206, and a second output unit 208.

The input unit 200*a* may be configured as a transmission gate. In an embodiment, for example, the input unit 200*a* may include a first fifth transistor M15*a* and a second fifth transistor M15*b* connected to each other in parallel between the first input terminal 211 and the controller 204 (or the fourth node N4). The first fifth transistor M15*a* may be set as P-type, and the second fifth transistor M15*b* may be set as an N-type.

The first fifth transistor M15*a* may be turned on and off in response to the first clock signal CLK1 input from a first second input terminal 212*a*. The second fifth transistor M15*b* may be turned on and off in response to the second clock signal CLK2 input from a second second input terminal 212*b*. The first fifth transistor M15*a* and the second fifth transistor M15*b* may be turned on and off simultaneously.

The second output unit 208 may include a twenty-first transistor M21 and a twenty-second transistor M22 connected to each other in series between the first power input terminal 215 and the second power input terminal 216. The twenty-first transistor M21 may be set as a P-type, and a gate electrode thereof may be connected to the first node N1. The twenty-second transistor M22 may be set as an N-type, and a gate electrode thereof may be connected to the first node N1. A common terminal of the twenty-first transistor M21 and the twenty-second transistor M22 may be connected to a second output terminal 218. The second output terminal 218 may output a carry signal.

The driver 202*b* may include a third transistor M13, a twenty-fourth transistor M24, a twenty-fifth transistor M25, a twenty-sixth transistor M26, a twenty-seventh transistor M27, and a second capacitor C2*b*. Here, the third transistor M13 may be included in the output unit 206 and may be a transistor that supplies the first voltage VGH to the output terminal 214. That is, the third transistor M13 may be shared by the output unit 206 and the driver 202*b*.

The third transistor M13 and the twenty-fourth transistor M24 may be connected in series between the first power input terminal 215 and the second power input terminal 216. In addition, a gate electrode of the third transistor M13 and the twenty-fourth transistor M24 may be connected to the first node N1. The third transistor M13 may be set as a P-type, and the twenty-fourth transistor M24 may be set as an N-type. In this case, the third transistor M13 and the twenty-fourth transistor M24 may operate or be driven as an inverter.

The twenty-fifth transistor M25 and the twenty-sixth transistor M26 may be connected to each other in series between the first power input terminal 215 and the second power input terminal 216. In addition, a gate electrode of the twenty-fifth transistor M25 and the twenty-sixth transistor M26 may be connected to the fourth node N4. The twenty-fifth transistor M25 may be set as a P-type, and the twenty-sixth transistor M26 may be set as an N-type. In this case, the twenty-fifth transistor M25 and the twenty-sixth transistor M26 may operate or be driven as an inverter.

The twenty-seventh transistor M27 may be connected between the first power input terminal 215 and the fourth node N4. In addition, a gate electrode of the twenty-seventh transistor M27 may be connected to a third input terminal 219. An off control signal or the like may be input to the third input terminal 219, and may be used to maintain the voltage of the output terminal 214 and the second output terminal 218 as the first voltage VGH. Each of the twenty-fourth transistor M24 and the twenty-sixth transistor M26 may further include a second gate electrode, and the second gate electrode thereof may be connected to the third power input terminal 217 to which the third voltage VGL2 is supplied.

The second capacitor C2*b* may be connected between the first power input terminal 215 and the fourth node N4. The second capacitor C2*b* may store a voltage of the fourth node N4.

The second transistor M12 may be set to a turn-on state in response to the high level control signal CS during the display scan period DSP. The first transistor M11 may maintain a turn-on state during the driving period including the display scan period DSP and the self-scan period SSP.

In an operation process, the carry signal CR or the start signal FLM is input to the first input terminal 211, and the clock signals CLK1 and CLK2 may be input to the second input terminals 212*a* and 212*b*, respectively. Then, the fifth transistors M15*a* and M15*b* may be set to a turn-on state, and thus a high level voltage (that is, the carry signal CR or the start signal FLM) may be supplied to the fourth node N4.

When the high level voltage is supplied to the fourth node N4, the twenty-sixth transistor M26 is turned on, and thus the second voltage VGL is supplied to the first node N1. When the second voltage VGL is supplied to the first node N1, the third transistor M13 and the twenty-first transistor M21 are turned on. When the third transistor M13 is turned on, the first voltage VGH (or the enable scan signal) is supplied to the output terminal 214. When the twenty-first transistor M21 is turned on, the first voltage VGH (or the carry signal) is supplied to the second output terminal 218.

After the first voltage VGH is supplied to the output terminal 214, supply of the carry signal CR or the start signal FLM to the first input terminal 211 is stopped, and in this case, the first input terminal 211 is set to the low level voltage. When the clock signals CLK1 and CLK2 are input to the second input terminals 212*a* and 212*b*, respectively, the low level voltage may be supplied to the fourth node N4.

When the low level voltage is supplied to the fourth node N4, the twenty-fifth transistor M25 is turned on, and thus the first voltage VGH is supplied to the first node N1. When the first voltage VGH is supplied to the first node N1, the twenty-fourth transistor M24 and the twenty-second transistor M22 are turned on. When the twenty-fourth transistor M24 is turned on, the second voltage VGL is supplied to the output terminal 214. When the twenty-second transistor M22 is turned on, the second voltage VGL is supplied to the second output terminal 218.

In addition, when the low level voltage is supplied to the fourth node N4, the fourth transistor M14 may be turned on, and thus the second voltage VGL may be supplied to the output terminal 214.

Figure 23:
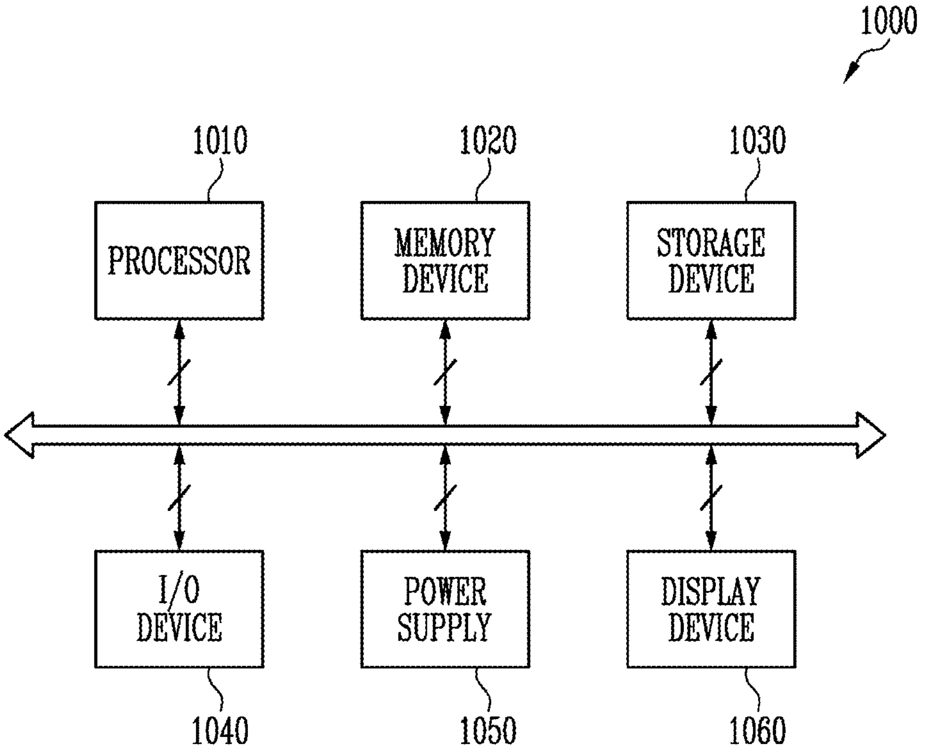
FIG. 23 is a schematic block diagram illustrating an electronic device including a display device in accordance with an embodiment.
Figure 24:
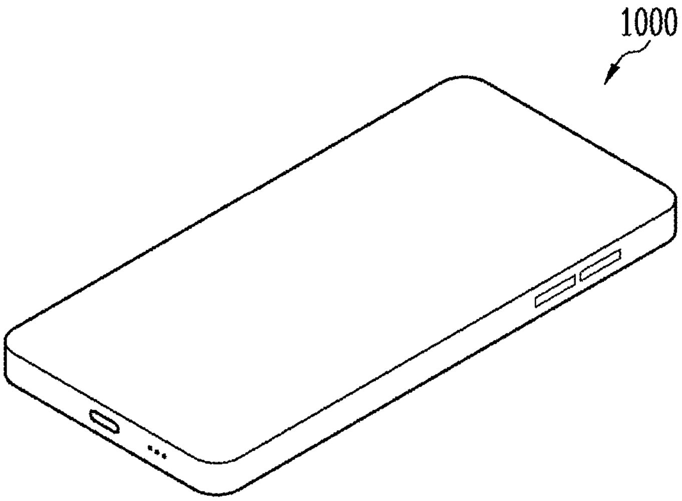
FIG. 24 is a schematic diagram illustrating an example where the electronic device of FIG. 23 is a smartphone.
Figure 25:
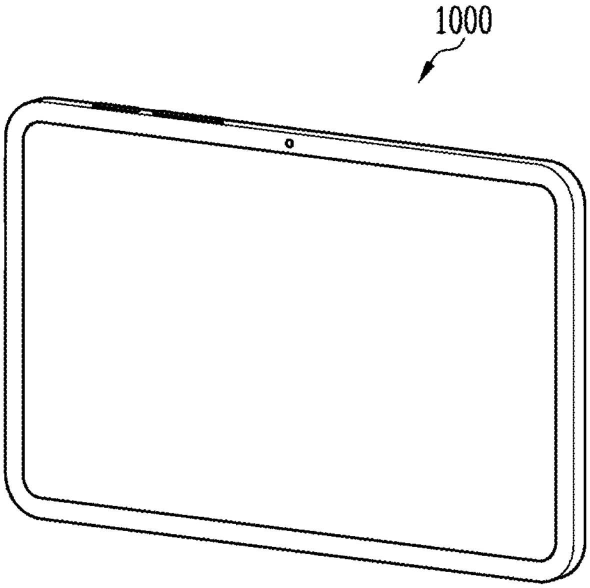
FIG. 25 is a schematic diagram illustrating an example where the electronic device of FIG. 23 is a tablet computer.

FIG. 23 is a schematic block diagram illustrating an electronic device 1000 including a display device in accordance with an embodiment. FIG. 24 is a schematic diagram illustrating an example where the electronic device 1000 of FIG. 23 is a smartphone. FIG. 25 is a schematic diagram illustrating an example where the electronic device 1000 of FIG. 23 is a tablet computer.

Referring to FIGS. 23 to 25, the electronic device 1000 may include a processor 1010, a memory device 1020, a storage device 1030, an input/output (I/O) device 1040, a power supply 1050, and a display device 1060. The display device 1060 may be the display device 100 of FIG. 1. The electronic device 1000 may further include various ports for communication with a video card, a sound card, a memory card, a USB device, or other systems. In an embodiment, as illustrated in FIG. 24, the electronic device 1000 may be a smartphone. In an embodiment, as illustrated in FIG. 25, the electronic device 1000 may be a tablet computer. However, the aforementioned examples are illustrative, and the electronic device 1000 is not necessarily limited to the aforementioned examples. For example, the electronic device 1000 may be a cellular phone, a video phone, a smart pad, a smartwatch, a navigation device for vehicles, a computer monitor, a laptop computer, a head-mounted display device, or the like.

The processor 1010 may perform specific calculations or tasks. In an embodiment, the processor 1010 may include at least one of a central processing unit, an application processor, a graphic processing unit, a communication processor, an image signal processor, a controller, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to image data signals and/or control signals from the processor 1010. The display device 1060 may be connected to other components through the buses or other communication links.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A stage circuit comprising:

an output unit which supplies a scan signal to an output terminal in response to a voltage of a first node and a second node;

an input unit which outputs a carry signal or a start signal input to a first input terminal in response to a clock signal;

a first transistor connected between the input unit and the second node and set to a turn-on state during a driving period; and a controller connected between the input unit and the first transistor in series or between the first transistor and the second node in series, wherein one frame period includes a display scan period, in which a data signal is received, and a self-scan period, in which light is emitted while maintaining the data signal, and wherein the controller controls an electrical connection between the input unit and the second node to maintain a boosted voltage of the second node during the self-scan period.

2. The stage circuit according to claim 1, wherein the controller is connected between the input unit and the first transistor.

3. The stage circuit according to claim 1, wherein the controller is connected between the first transistor and the second node.

4. The stage circuit according to claim 1, wherein the controller includes a second transistor.

5. The stage circuit according to claim 4, wherein a gate electrode of the second transistor is connected to the first node.

6. The stage circuit according to claim 4, wherein a gate electrode of the second transistor is connected to a control input terminal, and the control input terminal receives a control signal.

7. The stage circuit according to claim 6, wherein the control signal is set to a voltage level at which the second transistor is turned on during the display scan period, and is set to a voltage level at which the second transistor is turned off during the self-scan period.

8. The stage circuit according to claim 4, wherein the second transistor further includes a second gate electrode, and the second gate electrode is electrically connected to a gate electrode of the second transistor.

9. The stage circuit according to claim 4, wherein the second transistor further includes a second gate electrode, and the second gate electrode receives a direct current voltage.

10. The stage circuit according to claim 4, wherein the second transistor further includes a second gate electrode, and the second gate electrode receives an alternating current voltage.

11. The stage circuit according to claim 4, wherein the first transistor and the second transistor are transistors of different types.

12. The stage circuit according to claim 11, wherein the first transistor is a P-type transistor and the second transistor is an N-type transistor.

13. The stage circuit according to claim 11, wherein the first transistor is an N-type transistor and the second transistor is a P-type transistor.

14. The stage circuit according to claim 4, wherein the first transistor and the second transistor are P-type transistors.

15. The stage circuit according to claim 4, wherein the first transistor and the second transistor are N-type transistors.

16. The stage circuit according to claim 1, further comprising:

a driver which controls the voltage of the first node, wherein the controller is connected between the driver and the first transistor.

17. The stage circuit according to claim 1, further comprising:

a driver which controls the voltage of the first node, wherein the controller is connected between the input unit and the driver.

18. A display device comprising:

pixels connected to scan lines, emission control lines, and data lines;

a scan driver which supplies a scan signal to the scan lines; and an emission driver which supplies an emission control signal to the emission control lines, wherein a stage circuit is included in at least one selected from the scan driver and the emission driver, wherein the stage circuit comprises:

an output unit which supplies the scan signal or the emission control signal to an output terminal in response to a voltage of a first node and a second node;

an input unit which outputs a carry signal or a start signal input to a first input terminal in response to a clock signal;

a first transistor connected between the input unit and the second node and set to a turn-on state during a driving period; and a controller connected between the input unit and the first transistor or between the first transistor and the second node, wherein the controller controls an electrical connection between the input unit and the second node, and wherein the controller includes a second transistor connected between the input unit and the first transistor in series.

19. The display device according to claim 18, wherein the controller includes a second transistor and;

wherein a gate electrode of the second transistor is connected to the first node.

20. An electronic device, comprising:

a processor to provide input image data; and a display device to display an image based on the input image data;

Wherein the display device comprising:

pixels connected to scan lines, emission control lines, and data lines;

a scan driver which supplies a scan signal to the scan lines; and an emission driver which supplies an emission control signal to the emission control lines, wherein a stage circuit is included in at least one selected from the scan driver and the emission driver, wherein the stage circuit comprises:

an output unit which supplies the scan signal or the emission control signal to an output terminal in response to a voltage of a first node and a second node;

an input unit which outputs a carry signal or a start signal input to a first input terminal in response to a clock signal;

a first transistor connected between the input unit and the second node and set to a turn-on state during a driving period; and a controller connected between the input unit and the first transistor in series or between the first transistor and the second node in series, wherein one frame period includes a display scan period, in which a data signal is received, and a self-scan period, in which light is emitted while maintaining the data signal, and wherein the controller controls an electrical connection between the input unit and the second node to maintain a boosted voltage of the second node during the self-scan period.

* * * * *